United States Patent
Louwet

(10) Patent No.: US 7,820,078 B2
(45) Date of Patent: Oct. 26, 2010

(54) LAYER CONFIGURATION WITH IMPROVED STABILITY TO SUNLIGHT EXPOSURE

(75) Inventor: Frank Louwet, Diepenbeek (BE)

(73) Assignee: Agfa Graphics, N.V., Mortsel (BE)

( * ) Notice: Subject to any disclaimer, the term of this patent is extended or adjusted under 35 U.S.C. 154(b) by 183 days.

(21) Appl. No.: 12/107,898

(22) Filed: Apr. 23, 2008

(65) Prior Publication Data

US 2009/0148722 A1 Jun. 11, 2009

Related U.S. Application Data

(60) Provisional application No. 61/012,111, filed on Dec. 7, 2007.

(51) Int. Cl.
*H01B 1/20* (2006.01)
(52) U.S. Cl. ................... 252/500; 428/922; 528/377
(58) Field of Classification Search ............... 252/500; 428/922; 528/373, 377; 345/173
See application file for complete search history.

(56) References Cited

U.S. PATENT DOCUMENTS

| | | | |
|---|---|---|---|
| 5,035,926 A | 7/1991 | Jonas et al. | |
| 5,300,575 A | 4/1994 | Jonas et al. | |
| 5,427,841 A | 6/1995 | De Leeuw et al. | |
| 5,447,824 A | 9/1995 | Mutsaers et al. | |
| 5,620,800 A | 4/1997 | De Leeuw et al. | |
| 5,866,043 A * | 2/1999 | Ikkala et al. | 252/500 |
| 6,083,635 A | 7/2000 | Jonas et al. | |
| 2002/0022191 A1* | 2/2002 | Lamotte et al. | 430/160 |
| 2003/0193042 A1* | 10/2003 | Go et al. | 252/500 |
| 2006/0076451 A1 | 4/2006 | Biagiotti et al. | |
| 2008/0017833 A1* | 1/2008 | Louwet et al. | 252/500 |
| 2008/0290324 A1* | 11/2008 | Louwet et al. | 252/500 |
| 2009/0244027 A1* | 10/2009 | Yoshida et al. | 345/174 |

FOREIGN PATENT DOCUMENTS

| | | |
|---|---|---|
| EP | 0 440 957 B1 | 12/1990 |
| EP | 0 686 662 B1 | 4/1995 |
| JP | 2006-291133 | 10/2006 |
| JP | 2006-321840 | 11/2006 |
| JP | 2006-328276 | 12/2006 |
| JP | 2007-095506 * | 4/2007 |

* cited by examiner

*Primary Examiner*—Mark Kopec
(74) *Attorney, Agent, or Firm*—Leydig, Voit & Mayer, Ltd.

(57) ABSTRACT

Disclosed are a light-emitting diode, a photovoltaic device, a transistor, and an electroluminescent device, each comprising a layer disposed on a support, the layer comprising a [A] composition exclusive of hydroquinone comprising at least one polymer comprising (3,4-dialkoxythiophene) monomer units, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geq 15$.

16 Claims, No Drawings

LAYER CONFIGURATION WITH IMPROVED STABILITY TO SUNLIGHT EXPOSURE

CROSS-REFERENCE TO RELATED PATENT APPLICATIONS

This application claims priority to and the benefit of U.S. Provisional Application No. 61/012,111 filed Dec. 7, 2007, the entirety of which is herein incorporated by reference.

FIELD OF THE INVENTION

The present invention relates to a composition and layer configuration with improved stability to visible and UV light exposure at high surface conductivity.

BACKGROUND OF THE INVENTION

Polythiophenes have been studied extensively due to their interesting electrical and/or optical properties. Polythiophenes become electrically conducting upon chemical or electrochemical oxidation or reduction.

EP-A 339 340 discloses a polythiophene containing structural units of the formula:

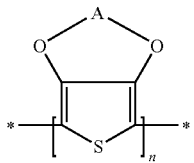

in which A denotes an optionally substituted $C_{1-4}$-alkylene radical and its preparation by oxidative polymerization of the corresponding thiophene.

EP-A 440 957 discloses dispersions of polythiophenes, constructed from structural units of formula (I):

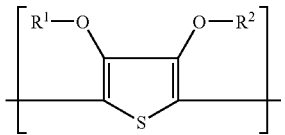

in which $R^1$ and $R^2$ independently of one another represent hydrogen or a $C_{1-4}$-alkyl group or together form an optionally substituted $C_{1-4}$-alkylene residue, in the presence of polyanions.

EP-A 686 662 discloses mixtures of A) neutral polythiophenes with the repeating structural unit of formula (I),

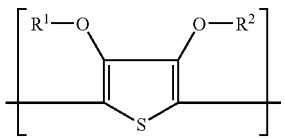

in which $R^1$ and $R^2$ independently of one another represent hydrogen or a C1-C4 alkyl group or together represent an optionally substituted C1-C4 alkylene residue, preferably an optionally with alkyl group substituted methylene, an optionally with $C_1$-$C_{12}$-alkyl or phenyl group substituted 1,2-ethylene residue or a 1,2-cyclohexene residue, and B) a di- or polyhydroxy- and/or carboxy groups or amide or lactam group containing organic compound; and conductive coatings therefrom which are tempered to increase their resistance preferably to <300 ohm/square. Examples of di- and polyhydroxy organic compounds disclosed in EP-A 0 686 662 are: sugar and sugar derivatives, such as saccharose, glucose, fructose, lactose, sugar alcohols, such as sorbitol and mannitol, and alcohols such as ethylene glycol, glycerine, diethylene glycol and triethylene glycol.

U.S. Pat. No. 5,427,841 discloses a laminated structure comprising an electrically insulating substrate carrying a polymer layer consisting essentially of a polymer selected from the group of poly-3,4-ethylene dioxythiophene, poly(3,4-ethylene dioxythiophene) wherein the ethylene group is substituted with a $C_1$-$C_{12}$ alkyl group, poly(3,4-ethylene dioxythiophene) wherein the ethylene group is substituted with an alkoxy group, and oligomers of ethylene dioxythiophene, said layer having first electrically conductive portions having a sheet resistance of maximally 1000 Ω/square, and a pattern of second substantially non-conductive portions whose sheet resistance is at least a factor of $10^6$ higher than that of the conductive polymer in said first portions, a metal layer being deposited into the electrically conductive first portions of said polymer layer. U.S. Pat. No. 5,427,841 also discloses a room temperature stable spin coating solution which comprises a substance selected from the group of monomers, oligomers and polymers selectively polymerizable (a) to an electrically conductive polymer having a sheet resistance of maximally 1000 Ω/square; (b) to an electrically non-conductive polymer; and (c) to a polymer having conductive and non-conductive areas; said solution further including an oxidation agent; a base (e.g. imidazole); and a solvent.

U.S. Pat. No. 5,447,824 discloses a method of manufacturing a pattern of an electrically conductive polymer on a substrate surface, said method comprising: a) forming a liquid layer on a surface of said substrate from a solution containing a material capable of forming said electrically conductive polymer upon being heated, an oxidizing agent and a base (e.g. imidazole), b) exposing said liquid layer to patterned radiation, and c) heating said layer thereby forming a pattern of an electrically conductive polymer, said conductive polymer being formed in unexposed areas and a non-conductive polymer being formed in the exposed areas of the layer.

U.S. Pat. No. 5,620,800 discloses a method of manufacturing a laminated structure having an electrically insulating substrate carrying a polymer layer comprising first electrically conductive portions having a sheet resistance of maximally 1000 Ω/square and a pattern of second relatively substantially non-conductive portions when the sheet resistance of the polymer in the first portions is compared to the sheet resistance of the polymer in the second portions, a metal layer being electrodeposited onto the electrically conductive first portions of said polymer layer, said method comprising the steps of: providing a layer of a solution comprising 3,4-ethylene dioxythiophene monomers, an oxidation agent, a base (e.g. imidazole) and a solvent on the substrate, exposing the layer to patterned radiation, heating said exposed layer thereby forming conductive polymer areas in the unexposed areas and said substantially non-conductive polymer areas in the exposed areas, and thereafter electrodepositing a metal layer selectively onto the conductive polymer from a metal salt solution.

US 2006/0076541A discloses a conductive composition comprising: a π-conjugated conductive polymer, a polyanion, and a hydroxy group-containing aromatic compound containing two or more hydroxy groups. In a preferred embodiment the polyhydroxyl group-containing aromatic compound is represented by formula (1):

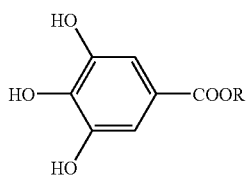

wherein R represents a group selected from a linear or branched alkyl group, an alkenyl group, a cycloalkenyl group, an aryl group, or an aralkyl group, each having 1 to 15 carbon atoms. In a further preferred embodiment the hydroxy group-containing aromatic compound contains a sulfo group and/or a carboxy group. The invention examples of US 2006/0076541A demonstrate conductivity enhancement upon addition of a hydroxy group-containing aromatic compound containing two or more hydroxy groups and enhanced heat stability and humidity stability of the electrical conductivity.

JP 2006-291133A1 discloses a conductive polymeric coating material contains a π-conjugated conductive polymer, a polyanion, an ester compound, and a solvent, the ester compound being a dehydration reaction product of a carboxylic acid compound having at least two carboxyl groups and a polyhydric alcohol compound having at least two hydroxyl groups. The method for producing the coating material comprises an ester compound synthesis process for synthesizing the ester compound by the dehydration reaction of the carboxylic acid compound having at least two carboxyl groups and the polyhydric alcohol compound having at least two hydroxyl groups and an ester compound addition process for adding the ester compound to a solution or dispersion containing the π-conjugated conductive polymer, the polyanion, and the solvent.

JP 2006-321840A discloses an electrically conductive polymer solution comprising a π-conjugated conductive polymer, a polyanion, a nitrogen-containing compound and a solvent, the nitrogen-containing compound having one or more nitrogen-containing functional groups selected from urea group, urethane group, allophanate group, biuret group, imide group and amide group, wherein the nitrogen atom of the nitrogen-containing functional group has the form of quaternarized salt, the nitrogen-containing compound of the conductive polymer solution preferably having one or more unsaturated double bonds. The conductive coating film is produced by coating the conductive polymer solution.

JP 2006-328276A1 discloses an electrically conductive polymer solution comprises a π-conjugated electrically conductive polymer, a solubilizing polymer, an amide compound and a solvent. The electrically conductive coating film is such as to be formed by coating the above polymer solution.

A general drawback of electroconductive layers containing poly(3,4-dialkoxythiophene) polymers, a polyanion and a hydroxy group-containing aromatic compound containing two or more hydroxy groups is the low electrical conductivity and the prohibitive increase in their surface resistance upon exposure to visible and UV light.

A general drawback of electroconductive layers containing poly(3,4-dialkoxythiophene) polymers and a polyanion with conductivity enhanced by contact with high boiling point liquids such as di- or polyhydroxy- and/or carboxy groups or amide or lactam group containing organic compound optionally followed by heating at elevated temperature is the rapid increase in their surface resistance upon exposure to visible and UV light.

ASPECTS OF THE INVENTION

It is therefore an aspect of the present invention to provide electroconductive layers containing poly(3,4-dialkoxythiophene) polymers, a polyanion and a hydroxy group-containing aromatic compound containing two or more hydroxy groups with increased electrical conductivity which do not undergo a rapid increase in their surface resistance upon exposure to visible and ultraviolet light or to a combination of heat and high humidity.

It is therefore further aspect of the present invention to provide electroconductive layers containing poly(3,4-dialkoxythiophene) polymers in the presence of a polyanion with conductivity enhanced by contact with high boiling point liquids which do not undergo a rapid increase in their surface resistance upon exposure to visible and ultraviolet light or to a combination of heat and high humidity.

Further aspects and advantages of the invention will become apparent from the description hereinafter.

SUMMARY OF THE INVENTION

It has been surprisingly found that the combined addition of at least one amino-compound or heterocyclic compound with at least one ring nitrogen atom, and a polyhydroxy group-containing aromatic compound to conductive compositions comprising a polymer comprising (3,4-dialkoxythiophene) monomer units and a polyanion whose conductivity has been enhanced by contact with high boiling point liquids provide layers and prints result in a dramatic increase in the stability of the surface resistance upon exposure to visible and UV-light and to a combination of heating and high humidity.

It has been also surprisingly been found that the addition of at least one amino-compound or heterocyclic compound with at least one ring nitrogen atom, and contact with high boiling point liquids which reduce the surface resistance to conductive compositions comprising a polymer comprising (3,4-dialkoxythiophene) monomer units, a polyanion and a polyhydroxy group-containing aromatic compound provides layers and prints result in a dramatic increase in the stability of the surface resistance upon exposure to visible and UV-light and to a combination of heating and high humidity.

Aspects of the present invention have been realized by a composition exclusive of hydroquinone comprising at least one polymer comprising (3,4-dialkoxythiophene) monomer units, in which the two alkoxy groups may be the same or different or together represent an optionally substituted oxyalkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geq 15$.

Aspects of the present invention are also realized by a process for producing a layer, according to the present invention, said process comprising the step of: providing a coating of a composition according to the present invention on a support optionally provided with one or more layers; and drying the coating.

Aspects of the present invention are also realized by a layer configuration on a support, the layer configuration comprising a layer exclusive of hydroquinone comprising at least one polymer comprising (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geq 15$.

Aspects of the present invention are also realized by a light emitting diode comprising a layer exclusive of hydroquinone comprising at least one polymer comprising (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geq 15$.

Aspects of the present invention are also realized by a photovoltaic device comprising a layer exclusive of hydroquinone comprising at least one polymer comprising (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geq 15$.

Aspects of the present invention are also realized by a transistor comprising a layer exclusive of hydroquinone comprising at least one polymer comprising (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geq 15$.

Aspects of the present invention are also realized by an electroluminescent device comprising a layer exclusive of hydroquinone comprising at least one polymer comprising (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geq 15$.

Preferred embodiments are disclosed in the dependent claims.

DEFINITIONS

The term alkyl means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term aqueous for the purposes of the present invention means containing at least 60% by volume of water, preferably at least 80% by volume of water, and optionally containing water-miscible organic solvents such as alcohols e.g. methanol, ethanol, 2-propanol, butanol, iso-amyl alcohol, octanol, cetyl alcohol etc.; glycols e.g. ethylene glycol; glycerine; N-methyl pyrrolidone; methoxypropanol; and ketones e.g. 2-propanone and 2-butanone etc.

The term polyanion, as used in disclosing the present invention, means a polymeric or non-polymeric polyanionic substance present as an acid, a salt or partially as an acid and partially as a salt.

The term amine, as used in disclosing the present invention, includes ammonia, ammonium hydroxide, and primary, secondary and tertiary amino-compounds.

The term heterocyclic compound with at least one ring nitrogen atom, as used in disclosing the present invention, includes all ring-systems comprising at least one ring nitrogen atom i.e. includes all such saturated, unsaturated and heteroaromatic compounds.

The term carboxy, as used in disclosing the present invention, is a carboxylic acid group or a salt thereof.

The term sulfo, as used in disclosing the present invention, is a sulphonic acid group or a salt thereof.

Conductivity enhancement refers to a process in which contact results in conductivity increase. Alternatively in the case of aprotic compounds with a dielectric constant $\geq 15$, e.g. N-methyl-pyrrolidinone, temperatures below 100° C. can be used. Such conductivity enhancement is observed with polythiophenes and can take place during the preparation of a layer or subsequently. Particularly preferred liquids for such treatment are formamide, 2-pyrrolidone and diethylene glycol such as disclosed in EP-A 686 662 and EP-A 1 003 179.

The abbreviation PEDOT represents poly(3,4-ethylene-dioxy-thiophene).

The abbreviation PSS represents poly(styrenesulphonic acid) or poly(styrenesulphonate).

The term e-paper as used in disclosing the present invention is a portable, reusable storage and display medium that looks like paper but can be repeatedly written on (refreshed)—by electronic means—thousands or millions of times. E-paper will be used for applications such as e-books, electronic newspapers, portable signs, and foldable, rollable displays. Information to be displayed is downloaded through a connection to a computer or a cell phone, or created with mechanical tools such as an electronic "pencil". There are a number of different technologies being developed: Xerox, in partnership with 3M, has created an e-paper called Gyricon and Lucent, in partnership with a company called E Ink, is working on a device (also called E Ink) that is expected to be available within the next few years. Both of these technologies enable a black (or other color) and white display. The Gyricon version consists of a single sheet of transparent plastic, containing millions of tiny bichromal (two color) beads in oil-filled pockets. Lucent's E Ink device uses electronic ink and combines thin, plastic, flexible transistors with polymer LEDs (light-emitting diodes) to create what are called smart pixels.

The term touch screen as used in disclosing the present invention is a computer display screen that is sensitive to human touch, allowing a user to interact with the computer by touching pictures or words on the screen. Touch screens are used with information kiosks, computer-based training devices, and systems designed to help individuals who have difficulty manipulating a mouse or keyboard. There are three types of touch screen technology: resistive, surface wave and capacitive.

Composition

Aspects of the present invention have been realized by a composition exclusive of hydroquinone comprising at least one polymer comprising (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant $\geqq 15$.

According to a first embodiment of the composition, according to the present invention, the composition further contains a dispersion medium.

According to a second embodiment of the composition, according to the present invention, the composition further contains an organic liquid as dispersion medium.

According to a third embodiment of the composition, according to the present invention, the composition further contains water as dispersion medium.

According to a fourth embodiment of the composition, according to the present invention, the composition further contains an aqueous medium.

According to a fifth embodiment of the composition, according to the present invention, the composition further contains an aqueous medium with a pH of at least 3.5, preferably of at least 4.0 and particularly preferably of at least 4.5.

According to a sixth embodiment of the composition, according to the present invention, the composition further contains a surfactant.

According to a seventh embodiment of the composition, according to the present invention, the composition further contains a binder.

According to an eighth embodiment of the composition, according to the present invention, the composition further contains a cross-linking agent.

According to a ninth embodiment of the composition, according to the present invention, the composition is exclusive of an ester compound produced by the dehydration of a polycarboxylic acid compound with at least two carboxyl groups and a polyhydric alcohol with at least two hydroxyl-groups.

According to a tenth embodiment of the composition, according to the present invention, the composition is exclusive of imide compound.

According to an eleventh embodiment of the composition, according to the present invention, the composition is exclusive of tertiary ammonium compounds.

According to a twelfth embodiment of the composition, according to the present invention, the composition is exclusive of aromatic or heteroaromatic amide compounds.

According to a thirteenth embodiment of the composition, according to the present invention, the polyanion and the at least one polymer comprising (3,4-dialkoxythiophene) monomer units are present in a latex and the weight ratio of the polyanion to the polymer comprising (3,4-dialkoxythiophene) monomer units in the latex is at least 4.0.

According to a fourteenth embodiment of the composition, according to the present invention, the composition is a printing ink e.g. a screen-printing ink, an offset ink. a flexographic ink, an ink-jet ink or a gravure ink.

According to a fifteenth embodiment of the composition, according to the present invention, the composition is a coating composition.

Polymer Containing Optionally Substituted 3,4-alkylenedioxythiophene Monomer Units The polymer, according to the present invention, contains optionally substituted 3,4-alkylenedioxythiophene monomer units in which the two alkoxy groups may be the same or different or together represent an optionally substituted oxy-alkylene-oxy bridge.

According to a sixteenth embodiment of the composition, according to the present invention, the polymer is selected from the group consisting of: poly(3,4-methylenedioxy-thiophene), poly(3,4-methylenedioxythiophene) derivatives, poly(3,4-ethylene-dioxythiophene), poly(3,4-ethylene-dioxy-thiophene) derivatives, poly(3,4-propylenediox-ythiophene), poly(3,4-propylenedioxy-thiophene) derivatives, poly(3,4-butylenedioxythiophene), poly(3,4-butylenedioxythiophene) derivatives and copolymers therewith. The term derivatives used in disclosing the ninth embodiment of the composition, according to the present invention, means that the monomers are substituted.

According to a seventeenth embodiment of the composition, according to the present invention, the substituents for the oxy-alkylene-oxy bridge are alkyl, alkoxy, alkyloxyalkyl, alkyloxyalkylenecarboxy, alkyloxyalkylenesulfo, carboxy, alkylsulphonato and carboxy ester groups.

According to an eighteenth embodiment of the composition, according to the present invention, the optionally substituted oxy-alkylene-oxy bridge is a 1,2-ethylene group, an optionally alkyl-substituted methylene group, an optionally $C_{1-12}$-alkyl- or phenyl-substituted 1,2-ethylene group, a 1,3-propylene group or a 1,2-cyclohexylene group.

According to a nineteenth embodiment of the composition, according to the present invention, the optionally substituted 3,4-alkylenedioxythiophene structural units are represented by formula (I):

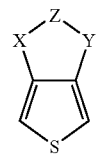

(I)

in which X and Y are O, Z is —$(CH_2)_m$—$CR^3R^4$—$(CH_2)_n$—; $R^3$ is hydrogen or —$(CH_2)_s$—O—$(CH_2)_p$—$SO_3^-M^+$; $R^4$ is —$(CH_2)_s$—O—$(CH_2)_p$—$SO_3^-M^+$; $M^+$ is a cation; m and n are independently a whole number from 0 to 3; s is a whole number from 0 to 10; and p is a whole number from 1 to 18.

According to a twentieth embodiment of the composition, according to the present invention, the polymer containing optionally substituted 3,4-alkylenedioxythiophene structural units is a polythiophene according to formula (IV)

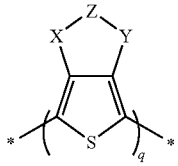

(IV)

in which X and Y are O, Z is $-(CH_2)_m-CR^3R^4-(CH_2)_n-$; $R^3$ is hydrogen or $-(CH_2)_s-O-(CH_2)_p-SO_3^-M^+$; $R^4$ is $-(CH_2)_s-O-(CH_2)_p-SO_3^-M^+$; $M^+$ is a cation; m and n are independently a whole number from 0 to 3; s is a whole number from 0 to 10; and p is a whole number from 1 to 18; and q is a whole number from 2 to 10,000.

According to a twenty-first embodiment of the composition, according to the present invention, the polymer containing optionally substituted 3,4-alkylenedioxythiophene structural units is poly[4-(2,3-dihydro-thieno[3,4-b][1,4]dioxin-2-ylmethoxy)-butane-1-sulphonic acid].

According to a twenty-second embodiment of the composition, according to the present invention, the polymer containing optionally substituted 3,4-alkylenedioxythiophene structural units is poly(3,4-ethylenedioxythiophene).

Polymers, according to the present invention, can be polymerized chemically or electrochemically. Chemical polymerization can be carried out oxidatively or reductively. The oxidation agents used for the oxidative polymerisation of pyrrole, as described, for example, in Journal of the American Chemical Society, volume 85, pages 454-458 (1963) and J. Polymer Science Part A Polymer Chemistry, volume 26, pages 1287-1294 (1988), can be utilized for the oxidative polymerization of such polymers.

Inexpensive and easily accessible oxidation agents such as iron (III) salts such as $FeCl_3$, the iron (III) salts of organic acids, e.g. $Fe(OTs)_3$, $H_2O_2$, $K_2Cr_2O_7$, alkali and ammonium persulphates, alkali perborates and potassium permanganate can be used in the oxidative polymerization.

Theoretically the oxidative polymerization of thiophenes requires 2.25 equivalents of oxidation agent per mole thiophene of formula (III) [see e.g. J. Polymer Science Part A Polymer Chemistry, volume 26, pages 1287-1294 (1988)]. In practice an excess of 0.1 to 2 equivalents of oxidation agent is used per polymerizable unit. The use of persulphates and iron (III) salts has the great technical advantage that they do not act corrosively. Furthermore, in the presence of particular additives oxidative polymerization to the polymers, according to the present invention, proceeds so slowly that the thiophenes and oxidation agent can be brought together as a solution or paste and applied to the substrate to be treated. After application of such solutions or pastes the oxidative polymerization can be accelerated by heating the coated substrate as disclosed in U.S. Pat. No. 6,001,281 and WO 00/14139 herein incorporated by reference.

Reductive polymerization can be performed using the Stille (organotin) or Suzuki (organoboron) routes described in 2002 by Apperloo et al. in Chem. Eur. Journal, volume 8, pages 2384-2396, and as disclosed in 2001 in Tetrahedron Letters, volume 42, pages 155-157 and in 1998 in Macromolecules, volume 31, pages 2047-2056 respectively or with nickel complexes as disclosed in 1999 in Bull. Chem. Soc. Japan, volume 72, page 621 and in 1998 in Advanced Materials, volume 10, pages 93-116.

Optionally substituted 3,4-dialkoxythiophene monomer units, according to the present invention, can be chemically or electrochemically copolymerized with other thiophene monomer or polymerizable heterocyclic compounds such as pyrrole.

Polyanion

The polyanion compounds for use in the layer configuration, according to the present invention, are disclosed in EP-A 440 957 herein incorporated by reference and include polymeric carboxylic acids, e.g. polyacrylic acids, polymethacrylic acids, or polymaleic acids and polysulphonic acids, e.g. poly(styrene sulphonic acid). These polycarboxylic acids and polysulphonic acids can also be copolymers of vinylcarboxylic acids and vinylsulphonic acids with other polymerizable monomers, e.g. acrylic acid esters, methacrylic acid esters and styrene.

According to a twenty-third embodiment of the composition, according to the present invention, the at least one amino-compound or heterocyclic compound with at least one ring nitrogen atom is present in a molar ratio of at least 0.4 with respect to the monomer units of polyanion, with a molar ratio of at least 0.6 with respect to the monomer units of polyanion being preferred and a molar ratio of at least 0.8 with respect to the monomer units of polyanion being particularly preferred.

According to a twenty-fourth embodiment of the composition, according to the present invention, the polyanion is poly(styrene sulphonate).

Polyhydroxy Group-Containing Aromatic Compound

Aspects of the present invention have been realized by a composition comprising at least one polymer comprising (3,4-dialkoxythiophene) monomer units, in which the two alkoxy groups may be the same or different or together represent an optionally substituted oxy-alkylene-oxy bridge, a polyanion, at least one amino-compound or heterocyclic compound with at least one ring nitrogen atom, at least one polyhydroxy group-containing aromatic compound exclusive of sulfo groups and at least one compound selected from the group consisting of polyhydroxy- and/or carboxy group or amide or lactam group containing aliphatic compounds and aprotic compounds with a dielectric constant $\geq 15$.

According to a twenty-fifth embodiment of the composition, according to the present invention, the polyhydroxy group-containing aromatic compound is an optionally substituted polyhydroxy benzene e.g. pyrogallol, catechol, resorcinol, 1,2-dihydroxynaphthalene, 1,5-dihydroxynaphthalene, 2,6-dihydroxynaphthalene, gallic acid, gallic acid esters, 3,4-dihydroxybenzoic acid and 3,4-dihydroxybenzoic acid esters.

Suitable polyhydroxy group-containing aromatic compounds include:

| compound | | Melting point [° C.] |
|---|---|---|
| 1 | pyrogallol (1,2,3-trihydroxybenzene) | 133 |
| 2 | catechol (1,2-dihydroxybenzene) | 105 |
| 3 | resorcinol (1,3-dihydroxybenzene) | 110 |
| 4 | gallic acid (3,4,5-trihydroxybenzoic acid) | 253 (decomp.) |

-continued

| com-pound | | Melting point [° C.] |
|---|---|---|
| 5 | methyl gallate (methyl 3,4,5-trihydroxybenzoate) | 201-203 |
| 6 | ethyl gallate (ethyl 3,4,5-trihydroxybenzoate) | |
| 7 | propyl gallate (propyl 3,4,5-trihydroxybenzoate) | 148-150 |
| 8 | 2,3,4-trihydroxybenzoic acid | 228 (decomp.) |
| 9 | 2,3,4-trihydroxybenzoic acid methyl eater | |
| 10 | 2,3,4-trihydroxybenzoic acid ethyl ester | |
| 11 | 2,3,4-trihydroxybenzoic acid propyl ester | |
| 12 | 3,4-dihydroxybenzoic acid | 200-202 |
| 13 | 3,4-dihydroxybenzoic acid methyl ester | |
| 14 | 3,4-dihydroxybenzoic acid ethyl ester | |
| 15 | 3,4-dihydroxybenzoic acid propyl ester | |
| 16 | 2,5-dihydroxybenzoic acid | 205 (decomp.) |
| 17 | 2,5-dihydroxybenzoic acid methyl ester | |
| 18 | 2,5-dihydroxybenzoic acid ethyl ester | |
| 19 | 2,5-dihydroxybenzoic acid propyl ester | |
| 20 | 1,2-dihydroxynaphthalene | 101-103 |
| 21 | 1,5-dihydroxynaphthalene | 259-261(decomp) |
| 22 | 2,6-dihydroxynaphthalene | 223-225 |
| 23 | 1,2,4-trihydroxybenzene | 140 |
| 24 | 3,5-dihydroxybenzoic acid | 236-238(decomp) |
| 25 | 2,3-dihydroxybenzoic acid | 207-210 |
| 26 | 2,4-dihydroxybenzoic acid | 225-227(decomp) |
| 27 | 2,6-dihydroxybenzoic acid | 165 (decomp.) |
| 28 | 2,3-dihydroxy-1-pentadecylbenzene | |
| 29 | 2,5-dihydroxyacetophenone | 204-206 |
| 30 | 2,4-dihydroxybenzophenone | 144.5-147 |
| 31 | 2,6-dihydroxybenzophenone | |
| 32 | 3,4-dihydroxybenzophenone | |
| 33 | 3,5-dihydroxybenzophenone | |
| 34 | 2,4'-dihydroxydiphenylsulfone | |
| 35 | 2,2',5,5'-tetrahydroxydiphenylsulfone | |
| 36 | 3,3',5,5'-tetramethyl-4,4'-dihydoxydiphenylsulfone | |
| 37 | 1,6-dihydroxynaphthalene | 138-140 |
| 38 | 2,7-dihydroxynaphthalene | 187 (decomp.) |
| 39 | 2,3-dihydroxynaphthalene | 162-164 |
| 40 | 1,5-dihydroxynaphthalene-2,6-dicarboxylic acid | |
| 41 | 1,6-dihydroxynaphthalene-2,5-dicarboxylic acid | |
| 42 | 1,5-dihydroxynaphthoic acid | |
| 43 | 1,4-dihydroxy-2-phenyl naphthoate | |
| 44 | 5-methyl-1,2,3-trihydroxybenzene | |
| 45 | 5-ethyl-1,2,3-trihydroxybenzene | |
| 46 | 5-propyl-1,2,3-trihydroxybenzene | |
| 47 | trihydroxy benzoic acid | |
| 48 | trihydroxyacetophenone | |
| 49 | trihydroxybenzophenone | |
| 50 | trihydroxybenzaldehyde | |
| 51 | trihydroxyanthraquinone | |
| 52 | 2,4,6-trihydroxybenzene | 205 (decomp.) |
| 53 | tetrahydroxy-p-benzoquinone | |
| 54 | tetrahydroxyanthraquinone | |

Amino-Compounds and Heterocyclic Compounds with at Least One Ring Nitrogen Atom

The at least one amino-compound used in the composition or the layer configuration, according to the present invention, may be ammonia, ammonium hydroxide, or a primary, secondary or tertiary amino-compound. The substituents of the primary or secondary amino-compound are selected from the group consisting of aliphatic, aromatic, heterocyclic and heteroaromatic groups.

According to a twenty-sixth embodiment of the composition, according to the present invention, the at least one amino-compound is an aliphatic secondary amino-compound. Suitable aliphatic secondary amino-compounds include: 2-diethylamino-ethanol, 2-dimethylamino-ethanol and dicyclohexylamine.

Suitable tertiary amino-compounds include triethylamine and trimethylamine.

According to a twenty-seventh embodiment of the composition, according to the present invention, the at least one heterocyclic compounds with at least one ring nitrogen atom is a saturated compound.

According to a twenty-eighth embodiment of the composition, according to the present invention, the at least one heterocyclic compounds with at least one ring nitrogen atom is an unsaturated compound e.g. imidazole, imidazole derivatives e.g. benzimidazole, triazoles, triazole derivatives e.g. benztriazole, tetrazole and tetrazole derivatives e.g. 1-phenyl-5-mercaptotetrazole.

According to a twenty-ninth embodiment of the composition, according to the present invention, the at least one heterocyclic compounds with at least one ring nitrogen atom is a heteroaromatic compound e.g. benzimidazole, benztriazole, imidazole, pyridine, pyridine derivatives which may be substituted.

Suitable heterocyclic compounds with at least one ring nitrogen atom include imidazole, imidazole derivatives, pyrimidine, pyrimidine derivatives, piperidine, piperidine derivatives, pyrrolidine, pyrrolidine derivatives, pyridine, pyridine derivatives, quinoline, quinoline derivatives, isoquinoline, isoquinoline derivatives and 1,8-diazabicyclo[5.4.0]undec-7-ene:

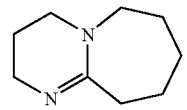

Suitable amino-compounds and heterocyclic compounds with at least one ring nitrogen atom with pKa's less than 4.9 include:

| | pKa |
|---|---|
| pyrrole | −0.27 |
| pyrazine | 0.60 |
| pyrimidine | 1.30 |
| benztriazole | 1.60 |
| 1,2,4-triazole | 2.19 |
| 1-phenyl-5-mercaptotetrazole | 2.30 |
| pyrazole | 2.53 |
| aniline | 4.63 |
| tetrazole | 4.89 |

According to a thirtieth embodiment of the composition, according to the present invention, the at least one amino-compound or heterocyclic compound with at least one ring nitrogen atom has a pKa of at least 4.9. Amino-compounds and heterocyclic compounds with at least one ring nitrogen atom with a pKa of at least 4.9 include:

| | pKa |
|---|---|
| quninoline | 4.94 |
| isoquinoline | 5.2 |
| pyridine | 5.21 |
| acridine | 5.6 |

-continued

| | pKa |
|---|---|
| benzimidazole | 6.00 |
| 2-methylbenzimidazole | 6.96 |
| imidazole | 7.03 |
| 4-methyl-imidazole | 7.45 |
| triethanolamine | 7.77 |
| triallylamine | 8.31 |
| 2-(dimethylamino)ethanol | 8.88 |
| furfurylamine | 8.89 |
| benzylamine | 9.33 |
| allylamine | 9.49 |
| ethanolamine | 9.50 |
| trimethylamine | 9.81 |
| ethylene diamine | 9.98 |
| N-methyl-piperidine | 10.08 |
| N-ethyl-piperidine | 10.40 |
| piperidine | 10.4 |
| t-butylamine | 10.45 |
| N-methylpyrrolidine | 10.46 |
| n-propylamine | 10.58 |
| n-butylamine | 10.61 |
| methylamine | 10.62 |
| isopropylamine | 10.63 |
| ethylamine | 10.63 |
| n-pentylamine | 10.63 |
| triethylamine | 10.7 |
| dimethylamine | 10.77 |
| diethylamine | 10.93 |
| di-n-propylamine | 11.00 |
| piperidine | 11.22 |
| pyrrolidine (pyrolidine) | 11.3 |
| (1,8-diazabicyclo[5.4.0]undec-7-ene) | 11.6 |

Polyhydroxy- and/or Carboxy Group or Amide or Lactam Group Containing Aliphatic Compound According to a thirty-first embodiment of the composition, according to the present invention, the at least one polyhydroxy- and/or carboxy group or amide or lactam group containing aliphatic compound and/or at least one aprotic compound with a dielectric constant $\geq 15$ is a polyhydroxy aliphatic compound with at least two hydroxy groups.

According to a thirty-second embodiment of the composition, according to the present invention, the at least one polyhydroxy- and/or carboxy group or amide or lactam group containing aliphatic compound is selected from the group consisting of diethylene glycol, 1,2-propandiol, glycerol, hexylene glycol, propylene glycol, di(ethylene glycol)ethyl ether acetate (Carbitol™ acetate), N-methylacetamide, N-methyl pyrrolidinone and sugar alcohols, such as sorbitol, mannitol, 2,4-dihydroxyacetophenone, saccharose and fructose.

According to a thirty-third embodiment of the composition, according to the present invention, the at least one polyhydroxy- and/or carboxy group or amide or lactam group containing aliphatic compound is an aprotic compound with a dielectric constant $\geq 15$, such as N-methyl pyrrolidinone, 2-pyrrolidinone, 1,3-dimethyl-2-imidazolidone, N,N,N',N'-tetramethylurea, formamide, N,N-dimethylformamide, N,N-dimethylacetamide, tetramethylene sulphone, dimethyl sulphoxide and hexamethylphosphoramide.

According to a thirty-fourth embodiment of the composition, according to the present invention, the at least one polyhydroxy- and/or carboxy group or amide or lactam group containing aliphatic compound is selected from the group consisting of 1,2-propandiol, propylene glycol, diethylene glycol, N-methyl pyrrolidinone and di(ethylene glycol)ethyl ether acetate (Carbitol™ acetate).

Surfactants

According to a thirty-fifth embodiment of the composition, according to the present invention, the layer further contains a non-ionic surfactant e.g. ethoxylated/fluororalkyl surfactants, polyethoxylated silicone surfactants, polysiloxane/polyether surfactants, ammonium salts of perfluro-alkylcarboxylic acids, polyethoxylated surfactants and fluorine-containing surfactants.

Suitable non-ionic surfactants include:

Surfactant no. 01=ZONYL™FSN, a 40% by weight solution of $F(CF_2CF_2)_{1-9}CH_2CH_2O)_xH$ in a 50% by weight solution of isopropanol in water where x=0 to about 25, from DuPont;

Surfactant no. 02=ZONYL™ FSN-100: $F(CF_2CF_2)_{1-9}CH_2CH_2O(CH_2CH_2O)_xH$ where x=0 to about 25, from DuPont;

Surfactant no. 03=ZONYL™ FS300, a 40% by weight aqueous solution of a fluorinated surfactant, from DuPont;

Surfactant no. 04=ZONYL™ FSO, a 50% by weight solution of a mixture of ethoxylated non-ionic fluoro-surfactant with the formula: $F(CF_2CF_2)_{1-7}CH_2CH_2O(CH_2CH_2O)_yH$ where y=0 to ca. 15 in a 50% by weight solution of ethylene glycol in water, from DuPont;

Surfactant no. 05=ZONYL™ FSO-100, a mixture of ethoxylated non-ionic fluoro-surfactant from DuPont with the formula: $F(CF_2CF_2)_{1-7}CH_2CH_2O(CH_2CH_2O)_yH$ where y=0 to ca. 15 from DuPont;

Surfactant no. 06=Tegoglide™ 410, a polysiloxane-polymer copolymer surfactant, from Goldschmidt;

Surfactant no. 07=Tegowet™, a polysiloxane-polyester copolymer surfactant, from Goldschmidt;

Surfactant no. 08=FLUORAD™ FC431: $CF_3(CF_2)_7SO_2(C_2H_5)N-CH_2CO-(OCH_2CH_2)_nOH$ from 3M;

Surfactant no. 09=FLUORAD™FC126, a mixture of the ammonium salts of perfluorocarboxylic acids, from 3M;

Surfactant no. 10=Polyoxyethylene-10-lauryl ether

Surfactant no. 11=FLUORAD™FC430, a 98.5% active fluoroaliphatic ester from 3M;

Surfactant no. 12=Synperonic A7, a $C_{11-13}$-fatty alcohol condensed with an average of 7 ethylene oxide groups, from ICI According to a thirty-sixth embodiment of the composition, according to the present invention, the layer further contains an anionic surfactant.

Suitable anionic surfactants include:

Surfactant no. 13=ZONYL™ 7950, a fluorinated surfactant, from DuPont;

Surfactant no. 14=ZONYL™ FSA, 25% by weight solution of $F(CF_2CF_2)_{1-9}CH_2CH_2SCH_2CH_2COOLi$ in a 50% by weight solution of isopropanol in water, from DuPont;

Surfactant no. 15=ZONYL™ FSE, a 14% by weight solution of $[F(CF_2CF_2)_{1-7}CH_2CH_2O]_xP(O)(ONH_4)_y$ where x=1 or 2; y=2 or 1; and x+y=3 in a 70% by weight solution of ethylene glycol in water, from DuPont;

Surfactant no. 16=ZONYL™ FSJ, a 40% by weight solution of a blend of $F(CF_2CF_2)_{1-7}CH_2CH_2O]_xP(O)(ONH_4)_y$ where x=1 or 2; y=2 or 1; and x+y=3 with a hydrocarbon surfactant in a 25% by weight solution of isopropanol in water, from DuPont;

Surfactant no. 17=ZONYL™ FSP, a 35% by weight solution of $[F(CF_2CF_2)_{1-7}CH_2CH_2O]_xP(O)(ONH_4)_y$ where x=1 or 2; y=2 or 1 and x+y=3 in 69.2% by weight solution of isopropanol in water, from DuPont;

Surfactant no. 18=ZONYL™ UR: $[F(CF_2CF_2)_{1-7}CH_2CH_2O]_x P(O)(OH)_y$ where x=1 or 2; y=2 or 1 and x+y=3, from DuPont;

Surfactant no. 19=ZONYL™ TBS: a 33% by weight solution of F(CF$_2$CF$_2$)$_{3-8}$CH$_2$CH$_2$SO$_3$H in a 4.5% by weight solution of acetic acid in water, from DuPont;

Surfactant no. 20=ammonium salt of perfluoro-octanoic acid from 3M.

Layer Configuration

Aspects of the present invention are also realized by a layer configuration on a support, the layer configuration comprising a layer exclusive of hydroquinone comprising at least one polymer comprising (3,4-dialkoxythiophene) monomer units, in which the two alkoxy groups may be the same or different or together represent an optionally substituted oxyalkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of polyhydroxy- and/or carboxy group or amide or lactam group containing aliphatic compounds and aprotic compounds with a dielectric constant ≧15.

According to a first embodiment of the layer configuration, according to the present invention, the polymer is selected from the group consisting of: poly(3,4-methylenedioxythiophene), poly(3,4-methylenedioxythiophene) derivatives, poly(3,4-ethylenedioxy-thiophene), poly(3,4-ethylenedioxy-thiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives and copolymers therewith.

According to a second embodiment of the layer configuration, according to the present invention, the polymer contains optionally substituted 3,4-alkylenedioxythiophene structural units is poly(3,4-ethylenedioxythiophene).

According to a third embodiment of the layer configuration, according to the present invention, the polyanion is poly(styrene sulphonate).

According to a fourth embodiment of the layer configuration, according to the present invention, the layer configuration is a light emitting diode.

According to a fifth embodiment of the layer configuration, according to the present invention, the layer configuration is a solar cell.

According to a sixth embodiment of the layer configuration, according to the present invention, the layer configuration is a touch screen.

According to a seventh embodiment of the layer configuration, according to the present invention, the layer configuration is an e-paper configuration.

According to an eighth embodiment of the layer configuration, according to the present invention, the layer is a between a positive electrode and a material capable of hole transport and capable of reducing hole-electron recombination at the positive electrode.

Electroluminescent Phosphors

According to a ninth embodiment of the layer configuration, according to the present invention, the layer configuration further comprises a layer of an electroluminescent phosphor.

According to a tenth embodiment of the layer configuration, according to the present invention, the layer configuration further comprises a layer of an electroluminescent phosphor, wherein the electroluminescent phosphor belongs to the class of II-VI semiconductors e.g. ZnS, or is a combination of group II elements with oxidic anions, the most common being silicates, phosphates, carbonates, germanates, stannates, borates, vanadates, tungstates and oxysulphates. Typical dopants are metals and all the rare earths e.g. Cu, Ag, Mn, Eu, Sm, Tb and Ce.

According to an eleventh embodiment of the layer configuration, according to the present invention, the layer configuration further comprises a layer of an electroluminescent phosphor, wherein the electroluminescent phosphor is encapsulated with a transparent barrier layer against moisture e.g. Al$_2$O$_3$ and AlN. Such phosphors are available from Sylvania, Shinetsu polymer KK, Durel, Acheson and Toshiba. An example of coatings with such phosphors is 72X, available from Sylvania/GTE, and coatings disclosed in U.S. Pat. No. 4,855,189.

According to a twelfth embodiment of the layer configuration, according to the present invention, the layer configuration further comprises a layer of an electroluminescent phosphor, wherein the electroluminescent phosphor is ZnS doped with manganese, copper or terbium, CaGa$_2$S$_4$ doped with cerium, electroluminescent phosphor pastes supplied by DuPont e.g.: LUXPRINT™ type 7138J, a white phosphor; LUXPRINT™ type 7151J, a green-blue phosphor; and LUXPRINT™ type 7174J, a yellow-green phosphor; and ELECTRODAG™ EL-035A supplied by Acheson.

According to a thirteenth embodiment of the layer configuration, according to the present invention, the layer configuration further comprises a layer of an electroluminescent phosphor, wherein the electroluminescent phosphor is a zinc sulphide phosphor doped with manganese and encapsulated with AlN.

Dielectric layer

According to a fourteenth embodiment of the layer configuration, according to the present invention, the layer configuration further comprises a dielectric layer.

Any dielectric material may be used in the dielectric layer, with yttria and barium titanate being preferred e.g. the barium titanate paste LUXPRINT™ type 7153E high K dielectric insulator supplied by DuPont and the barium titanate paste ELECTRODAG™ EL-040 supplied by Acheson. A positive ion exchanger may be incorporated into the dielectric layer to capture any ions escaping from the phosphor of the light-emitting layer. The amount of ion exchanger in the dielectric layer has to be optimized so that it has a maximum effectiveness in reducing black spots while not reducing the initial brightness level. It is therefore preferred to add 0.5 to 50 parts by weight of ion exchanger to 100 parts by weight of the total amount of resin and dielectric material in the dielectric layer. The ion exchanger may be organic or inorganic.

Suitable inorganic ion exchangers are hydrated antimony pentoxide powder, titanium phosphate, salts of phosphoric acid and silicic acid and zeolite.

Support

According to a fifteenth embodiment of the layer configuration, according to the present invention, the support is transparent or translucent.

According to a sixteenth embodiment of the layer configuration, according to the present invention, the support is paper, polymer film, glass or ceramic.

According to a seventeenth embodiment of the layer configuration, according to the present invention, the support is a transparent or translucent polymer film.

A transparent or translucent support suitable for use with the electroconductive or antistatic layers, according to the present invention, may be rigid or flexible and consist of a glass, a glass-polymer laminate, a polymer laminate, a thermoplastic polymer or a duroplastic polymer. Examples of thin flexible supports are those made of a cellulose ester, cellulose triacetate, polypropylene, polycarbonate or polyester, with poly(ethylene terephthalate) or poly(ethylene naphthalene-1, 4-dicarboxylate) being particularly preferred.

Process

Aspects of the present invention are realized by a process for producing a composition with a pH of at least 3.0, said process comprising the steps of:
i) providing an aqueous dispersion comprising at least one polymer comprising (3,4-dialkoxythiophene) monomer units, in which the two alkoxy groups may be the same or different or together represent an optionally substituted oxy-alkylene-oxy bridge, and a polyanion; and
ii) adding at least one polyhydroxy group-containing aromatic compound exclusive of sulfo groups; and at least one compound selected from the group consisting of polyhydroxy- and/or carboxy group or amide or lactam group containing aliphatic compounds and aprotic compounds with a dielectric constant $\geqq 15$, wherein the pH of said aqueous dispersion is increased to a pH of at least 3 with at least one amino-compound or heterocyclic compound with at least one ring nitrogen atom at any time during said process.

According to a first embodiment of the process for producing a composition, according to the present invention, the pH of the aqueous dispersion comprising at least one polymer comprising (3,4-dialkoxythiophene) monomer units, in which the two alkoxy groups may be the same or different or together represent an optionally substituted oxy-alkylene-oxy bridge, and a polyanion is adjusted to a value of at least 3.0 before addition of at least one polyhydroxy group-containing aromatic compound exclusive of sulfo groups; and at least one compound selected from the group consisting of polyhydroxy- and/or carboxy group or amide or lactam group containing aliphatic compounds and aprotic compounds with a dielectric constant $\geqq 15$.

Aspects of the present invention are also realized by a composition obtainable by the process for producing a composition a composition with a pH of at least 3.0, said process comprising the steps of: i) providing an aqueous dispersion comprising at least one polymer comprising (3,4-dialkoxythiophene) monomer units, in which the two alkoxy groups may be the same or different or together represent an optionally substituted oxy-alkylene-oxy bridge, and a polyanion; and ii) adding at least one polyhydroxy group-containing aromatic compound exclusive of sulfo groups; and at least one compound selected from the group consisting of polyhydroxy- and/or carboxy group or amide or lactam group containing aliphatic compounds and aprotic compounds with a dielectric constant $\geqq 15$, wherein the pH of said aqueous dispersion is increased to a pH of at least 3 with at least one amino-compound or heterocyclic compound with at least one ring nitrogen atom at any time during said process.

Electroluminescent Devices

According to an eighteenth embodiment of the layer configuration, according to the present invention, the layer configuration is an electroluminescent device.

According to a nineteenth embodiment of the layer configuration, according to the present invention, the layer configuration is a light emitting diode.

Thin film electroluminescent devices (ELDs) are all characterized by one (or more) electroluminescent active layer(s) sandwiched between two electrodes. Optionally a dielectric layer may also be part of the sandwich.

Thin film ELDs can be subdivided into organic and inorganic based ELDs. Organic-based thin film ELDs can be subdivided into low molecular weight organic devices including oligomers (Organic Light Emitting Diodes (OLEDs)) and high molecular weight organic devices (Polymer Light Emitting Diodes (PLEDs)). The inorganic ELDs on the other hand can be further subdivided into the High Voltage Alternating Current (HV-AC) ELDs and the Low Voltage Direct Current (LV-DC) ELDs. The LV-DC ELDs include Powder ELDs (DC-PEL Devices or DC-PELDs) and thin film DC-ELDs, hereinafter called Inorganic Light Emitting Diodes (ILEDs).

The basic construction of organic ELDs (PLED and OLED) comprises following layer arrangement: a transparent substrate (glass or flexible plastic), a transparent conductor, e.g. Indium Tin Oxide (ITO), a hole transporting layer, a luminescent layer, and a second electrode, e.g. a Ca, Mg/Ag or Al/Li electrode. For OLEDs the hole transporting layer and the luminescent layer are 10-50 nm thick and applied by vacuum deposition, whereas for PLEDs the hole transporting layer is usually about 40 nm thick and the luminescent layer is usually about 100 nm thick and applied by spin coating or other non-vacuum coating techniques. A direct voltage of 5-10 V is applied between both electrodes and light emission results from holes and electrons being injected from the positive and negative electrodes respectively combining in the luminescent layer thereby producing the energy to excite the luminescent species to emit light.

In OLEDs the hole transporting layer and electroluminescent layer consist of low molecular organic compounds, N,N'-diphenyl-1,1'-biphenyl-4,4'-diamine (TPD) can, for example be used as the hole transporter and aluminium (III) 8-hydroxyquinoline complex ($Alq_3$), polyaromatics (anthracene derivatives, perylene derivatives and stilbene derivatives) and polyhetero-aromatics (oxazoles, oxadiazoles, thiazoles etc.) can be used as electroluminescent compounds.

In PLEDs electroluminescent compounds that can be used are polymers like the non-conjugated polyvinylcarbazole derivatives (PVK) or conjugated polymers like poly(p-phenylene vinylenes) (PPV), polyfluorenes, poly(3-alkylthiophene), poly(p-phenylene ethynylenes) etc. These high-molecular-weight materials allow for the easy preparation of thin films by casting, and show a high resistance to crystallization.

Low voltage DC PEL Devices generally comprise a transparent substrate, a transparent conductor (ITO), a doped ZnS phosphor layer (20 μm), and a top electrode of evaporated aluminium. The phosphor layer is applied by means of the doctor blade technique or screen printing on an ITO conducting layer. Subsequently an aluminium electrode is applied by evaporation. Upon applying a direct current voltage of several volts (ITO positive), holes start moving towards the aluminium electrode, thereby creating an insulating region (about 1 μm in thickness) next to the ITO layer within one minute or so. This results in a current drop which is associated with the onset of light emission. This process has been called the forming process. In the thin high resistive phosphor layer thereby formed, high electric fields occur and electroluminescence is already possible at low voltages (typically between 10 and 30 V). Que et al. [see Appl. Phys. Lett., volume 73, pages 2727-2729 (1998)] using ZnS:Cu nano crystals achieved turn on voltages of below 5 V.

In hybrid LEDs, inorganic emitting so-called quantum dots are used in combination with organic polymers with charge transporting properties and in some cases also emitting properties. Hybrid LEDs with CdSe nano particles have been reported by Colvin et al. [see Nature, volume 370, pages 354-357, (1994)], Dabbousi et al. [see Appl. Phys. Lett., volume 66, pages 1316-1318 (1995), and Gao et al. [see J. Phys. Chem. B, volume 102, pages 4096-4103 (1998)]; and with ZnS:Cu nano-crystals have been reported by Huang et al. [see Appl. Phys. Lett., volume 70, pages 2335-2337 (1997)] all included herein by reference.

Photovoltaic Devices

According to a twentieth embodiment of the layer configuration, according to the present invention, the layer configuration is a photovoltaic device.

According to a twenty-first embodiment of the layer configuration, according to the present invention, the layer configuration is a solar cell.

According to a twenty-second embodiment of the layer configuration, according to the present invention, the layer configuration further comprises at least one photovoltaic layer. The photovoltaic layer may be an organic layer, a hybrid inorganic and organic layer or an inorganic layer.

Photovoltaic devices incorporating the layer configuration, according to the present invention, can be of two types: the regenerative type which converts light into electrical power leaving no net chemical change behind in which current-carrying electrons are transported to the anode and the external circuit and the holes are transported to the cathode where they are oxidized by the electrons from the external circuit and the photosynthetic type in which there are two redox systems one reacting with the holes at the surface of the semiconductor electrode and one reacting with the electrons entering the counter-electrode, for example, water is oxidized to oxygen at the semiconductor photoanode and reduced to hydrogen at the cathode. In the case of the regenerative type of photovoltaic cell, as exemplified by the Graetzel cell, the hole transporting medium may be a liquid electrolyte supporting a redox reaction, a gel electrolyte supporting a redox reaction, an organic hole transporting material, which may be a low molecular weight material such as 2,2',7,7'-tetrakis(N, N-di-p-methoxyphenyl-amine)9,9'-spirobifluorene (OMeTAD) or triphenylamine compounds or a polymer such as PPV-derivatives, poly(N-vinylcarbazole) etc., or inorganic semiconductors such as CuI, CuSCN etc. The charge transporting process can be ionic as in the case of a liquid electrolyte or gel electrolyte or electronic as in the case of organic or inorganic hole transporting materials.

Such regenerative photovoltaic devices can have a variety of internal structures in conformity with the end use. Conceivable forms are roughly divided into two types: structures which receive light from both sides and those which receive light from one side. An example of the former is a structure made up of a transparently conductive layer e.g. an ITO-layer or a PEDOT/PSS-containing layer and a transparent counter electrode electrically conductive layer e.g. an ITO-layer or a PEDOT/PSS-containing layer having interposed therebetween a photosensitive layer and a charge transporting layer. Such devices preferably have their sides sealed with a polymer, an adhesive or other means to prevent deterioration or volatilization of the inside substances. The external circuit connected to the electrically-conductive substrate and the counter electrode via the respective leads is well-known.

Organic photovoltaic layers of the layer configuration, according to the present invention are, for example, mixtures of fullerene molecules (as electron acceptor and electron transporter) with conjugated polymers (e.g. substituted polyphenylenevinylene (PPV) (as light absorber and hole transporter)[see Brabec et al., Adv. Funct. Mater., volume 11(1), pages 15-26 (2001)]. In 1995 Halls et al. reported in Nature, volume 376, page 498 the successful use of acceptor-type conjugated polymers instead of fullerenes.

Alternatively the layer configuration, according to the present invention, can be incorporated in hybrid photovoltaic compositions such as described in 1991 by Graetzel et al. in Nature, volume 353, pages 737-740, in 1998 by U. Bach et al. [see Nature, volume 395, pages 583-585 (1998)] and in 2002 by W. U. Huynh et al. [see Science, volume 295, pages 2425-2427 (2002)]. In all these cases, at least one of the components (light absorber, electron transporter or hole transporter) is inorganic (e.g. nano-$TiO_2$ as electron transporter, CdSe as light absorber and electron transporter) and at least one of the components is organic (e.g. triphenylamine as hole transporter or poly(3-hexylthiophene) as hole transporter).

Inorganic photovoltaic layers which can be used in the layer configuration according to this invention are described in EP-A 1 176 646.

Transistors

According to a twenty-third embodiment of the layer configuration, according to the present invention, the layer configuration is a transistor.

According to a twenty-fourth embodiment of the layer configuration, according to the present invention, the layer configuration further comprises a layer with one or more of the electron transporting or hole transporting components described above, but within such a configuration that it can be used as a transistor. The semiconductor can be n-type, p-type or both (ambipolar transistor) and can be either organic or inorganic.

INDUSTRIAL APPLICATION

Compositions, according to the present invention, can be used as coating compositions and printing inks e.g. in flexographic printing, in offset printing, in screen printing, in ink-jet printing and in gravure printing.

Layer configurations, according to the present invention, can also be used in a wide range of electronic devices such as photovoltaic devices, solar cells, batteries, capacitors, light emitting diodes, organic and inorganic electroluminescent devices, smart windows, electrochromic devices, sensors for organic and bio-organic materials and field effect transistors, touch screens and e-paper configurations [see also chapter 10 of the Handbook of Oligo- and Polythiophenes, Edited by D. Fichou, Wiley-VCH, Weinheim (1999)].

The invention is illustrated hereinafter by way of comparative and invention examples. The percentages and ratios given in these examples are by weight unless otherwise indicated.

Subbing layer Nr. 01 used in the LAYER CONFIGURATIONS exemplified below has the composition:

| | |
|---|---|
| copolymer of 88% vinylidene chloride, 10% methyl acrylate and 2% itaconic acid | 79.1% |
| Kieselsol ® 100F, a colloidal silica from BAYER | 18.6% |
| Mersolat ® H, a surfactant from BAYER | 0.4% |
| Ultravon ® W, a surfactant from CIBA-GEIGY | 1.9% |

Ingredients used in the COMPARATIVE and REFERENCE LAYER CONFIGURATIONS:

Polyhydroxy-Compounds:
DEG=diethylene glycol (disclosed in EP-A 686 662);
TEG=triethylene glycol (disclosed in EP-A 686 662).

Aprotic Compound with a Dielectric Constant $\geq 15$:
formamide
2-pyrrolidone
DMSO=dimethyl sulphoxide
NMP=N-methyl pyrrolidone
Z6040=3-glycidoxypropyltri-methoxy-silane from Dow Chemical PEDOT/PSS Dispersion A0:
a 1.11% by weight aqueous dispersion of PEDOT/PSS with a PEDOT:PSS weight ratio of 1:2.46, which was produced under an inert atmosphere such that when said initiator is added less than 3 mg of oxygen per litre of said reaction medium is present in said reaction medium as disclosed in WO 03/048227A.

PEDOT/PSS Dispersion A1:
7.1 g [0.1043 moles] of imidazole was added to 350 g of PEDOT/PSS dispersion A0 [0.01492 moles PSS] whereby the initial pH of 2.0 was increased to 7.85.

PEDOT/PSS Dispersion A2:
680.6 g of PEDOT/PSS dispersion A0 [0.02901 moles PSS] was added to 100 g of PEDOT/PSS dispersion A1 [0.004178 moles PSS; 0.029207 moles imidazole] whereby the initial pH of 7.85 was reduced to 7.0 [1:0.88 PSS/imidazole molar ratio].

PEDOT/PSS Dispersion A3:
905.1 g of PEDOT/PSS dispersion A0 [0.03858 moles PSS] was added to 100 g of PEDOT/PSS dispersion A1 [0.004178 moles PSS; 0.029207 moles imidazole] whereby the initial pH of 7.85 was reduced to 4.5 [1:0.683 PSS/imidazole molar ratio].

PEDOT/PSS Dispersion A4:
10.20 g of 1M aqueous imidazole solution [0.01020 moles] was added to 350 g of PEDOT/PSS dispersion A0 [0.01492 moles PSS] whereby the initial pH of 2.11 was increased to 4.5 [1:0.684 PSS/imidazole molar ratio].

PEDOT/PSS Dispersion A5:
1.26 g of PEDOT/PSS dispersion A0 [0.00005355 moles] was added to 100 g of PEDOT/PSS dispersion A4 [0.004142 moles PSS; 0.002832 moles imidazole] whereby the initial pH of 4.5 was reduced to 4.0 [1:0.675 PSS/imidazole molar ratio].

PEDOT/PSS Dispersion A6:
2.29 g of PEDOT/PSS dispersion A0 [0.0000975 moles PSS] was added to 100 g of PEDOT/PSS dispersion A4 [0.004142 moles PSS; 0.002832 moles imidazole] whereby the initial pH of 4.5 was reduced to 3.5 [1:0.668 PSS/imidazole molar ratio].

PEDOT/PSS Dispersion A7:
10.68 g of PEDOT/PSS dispersion A0 [0.000455 moles PSS] was added to 100 g of PEDOT/PSS dispersion A4 [0.004142 moles PSS; 0.002832 moles imidazole] whereby the initial pH of 4.5 was reduced to 3.0 [1:0.616 PSS/imidazole molar ratio].

PEDOT/PSS Dispersion A8:
51.79 g of PEDOT/PSS dispersion A0 [0.002208 moles PSS] was added to 100 g of PEDOT/PSS dispersion A4 [0.004142 moles PSS; 0.002832 moles imidazole] whereby the initial pH of 4.5 was reduced to 2.5 [1:0.446 PSS/imidazole molar ratio].

PEDOT/PSS Dispersion B0:
a 1.14% by weight aqueous dispersion of PEDOT/PSS with a PEDOT:PSS weight ratio of 1:2.46, which was produced under an inert atmosphere such that when said initiator is added less than 3 mg of oxygen per litre of said reaction medium is present in said reaction medium as disclosed in WO 03/048227A.

PEDOT/PSS Dispersion C0:
a 1.13% by weight aqueous dispersion of PEDOT/PSS with a PEDOT:PSS weight ratio of 1:2.46, which was produced as described in EP 0 440 957A i.e. in the presence of air.

PEDOT/PSS Dispersion C1:
2.67 g [0.00267 moles] of a 1M aqueous solution of imidazole was added to 100 g of PEDOT/PSS dispersion C0 [0.004341 moles PSS] whereby the initial pH of 2.0 was increased to 3.0 [1:0.616 PSS/imidazole molar ratio].

PEDOT/PSS Dispersion C2:
3.01 g [0.00301 moles] of 1M imidazole was added to 100 g of PEDOT/PSS dispersion C0 [0.004341 moles PSS] whereby the initial pH of 2.0 was increased to 5.0 [1:0.693 PSS/imidazole molar ratio].

PEDOT/PSS Dispersion C3:
3.81 g [0.00381 moles] of 1M imidazole was added to 100 g of PEDOT/PSS dispersion C0 [0.004341 moles PSS] whereby the initial pH of 2.0 was increased to 7.0 [1:0.877 PSS/imidazole molar ratio].

PEDOT/PSS Dispersion D0:
a 1.15% by weight aqueous dispersion of PEDOT/PSS with a PEDOT:PSS weight ratio of 1:2.46, which was produced under an inert atmosphere such that when said initiator is added less than 3 mg of oxygen per litre of said reaction medium is present in said reaction medium as disclosed in WO 03/048227A.

PEDOT/PSS Dispersion E0:
a 1.15% by weight aqueous dispersion of PEDOT/PSS with a PEDOT:PSS weight ratio of 1:2.46, which was produced under an inert atmosphere such that when said initiator is added less than 3 mg of oxygen per litre of said reaction medium is present in said reaction medium as disclosed in WO 03/048227A.

Effect of imidazole, 2-(dimethylamino)ethanol and Pyridine Upon the pH of PEDOT/PSS-Dispersion A0

| added imidazole [g/100 g A0] | added 2-(dimethylamino)ethanol [g/100 g A0] | pH |
|---|---|---|
| 0 | 0 | 2.11 |
| 0.132 | 0.163 | 2.5 |
| 0.198 | 0.256 | 3.5 |
| 0.203; 0.196 | 0.265 | 4.5 |
| 0.255; 0.262 | 0.270; 0.277 | 7.0 |

Effect of Pyridine Upon the pH of
PEDOT/PSS-Dispersion EO

| added pyridine [g/100 g EO] | pH |
|---|---|
| 0 | 2.11 |
| 0.11 | 2.26 |
| 0.22 | 2.6 |
| 0.31 | 3.45 |
| 0.38 | 5.26 |
| 0.78 | 5.84 |
| 1.33 | 6.17 |
| 2.22 | 6.42 |
| 4.0 | 6.66 |
| 6.67 | 6.85 |
| 11.11 | 7.02 |

COMPARATIVE EXAMPLES 1 TO 7

The compositions of COMPARATIVE EXAMPLES 1 to 7 were produced by adding the ingredients given in Table 1 to the PEDOT/PSS dispersions specified in Table 1.

TABLE 1

| | Comparative Example | | | | | | |
|---|---|---|---|---|---|---|---|
| | 1 | 2 | 3 | 4 | 5 | 6 | 7 |
| solid PEDOT/PSS | (0.268} | (0.268} | (0.268} | (0.268} | (0.268} | (0.268} | (0.268} |
| diethylene glycol | 2.9 | 2.9 | 2.9 | 2.9 | 2.9 | 2.9 | 2.9 |
| isopropanol | 2.1 | 2.1 | 2.1 | 2.1 | 2.1 | 2.1 | 2.1 |
| PEDOT/PSS dispersion B0 | 23.31 | 23.31 | 23.31 | 23.31- | 23.31 | 23.31 | 23.31 |
| deionized water | 31.04 | 31.04 | 31.04 | 31.04 | 31.04 | 31.04 | 31.17 |
| Z6040 | 0.13 | 0.13 | 0.13 | 0.13 | 0.13 | 0.13 | — |
| 1M aq. 2-dimethyl-aminoethanol | — | to pH 7.52 | — | — | — | — | to pH 7.74 |
| 1M aq. imidazole | — | — | to pH 7.02 | — | — | — | — |
| 1M aqueous NH$_4$OH | — | — | — | to pH 7.43 | — | — | — |
| 1M aqueous NaOH | — | — | — | — | to pH 8.71 | — | — |
| 1M aqueous KOH | — | — | — | — | — | to pH 8.16 | — |
| pH (initial) | 2.4 | 7.52 | 7.02 | 7.43 | 8.71 | 8.16 | 7.74 |
| pH (after 2 h) | 2.53 | 4.73 | 7.05 | 6.74 | 7.18 | 6.77 | 7.28 |
| pH (after 34 h) | 2.43 | 6.41 | 6.94 | 6.17 | 6.46 | 6.32 | 605 |
| pH (after 90 h) | 2.4 | 5.69 | 6.89 | 5.7 | 6.03 | 5.81 | 6.02 |
| pH (after 168 h) | 2.52 | 5.56 | 6.84 | 5.7 | 6.07 | 5.25 | 5.78 |
| pH (after 336 h) | 2.47 | 5.48 | 6.94 | 5.54 | 5.77 | 5.64 | 5.6 |
| pH (after 1 month) | 2.48 | 5.33 | 6.8 | 5.39 | 5.66 | 5.5 | 5.38 |
| pH (after 2 months) | 2.52 | 5.37 | 6.86 | 5.29 | 5.42 | 5.43 | 5.23 |

The compositions of COMPARATIVE EXAMPLES 1 to 7 after different standing times were coated on a 175 μm thick transparent PET sheet provided with subbing layer 1 on the side of the PET sheet being coated with a Braive coater at coating speed 2 with a barcoater giving a wet-layer thickness of 40 μm and the coatings dried for 3 minutes at 130° C. A strip 45 mm wide was cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of the fresh untreated strips was performed on two occasions during the measurements and the average recorded in Table 2 for each strip together with the appropriate standing time of the dispersion prior to coating.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 2.

TABLE 2

| Comparative Example nr | Standing time | | | | | | | | | | | |
|---|---|---|---|---|---|---|---|---|---|---|---|---|
| | fresh | | 2 h | | 34 h | | 90 h | | 168 h | | 336 h | |
| | OD | SER | OD | SER | OD | SER | OD | SER | OD | SER | OD | SER |
| 1 | 0.043 | 389 | 0.047 | 376 | 0.052 | 349 | 0.052 | 326 | 0.054 | 319 | 0.047 | 352 |
| 2 | 0.060 | 368 | 0.055 | 400 | 0.060 | 374 | 0.062 | 355 | 0.066 | 347 | 0.058 | 405 |
| 3 | 0.067 | 390 | 0.064 | 425 | 0.069 | 424 | 0.070 | 414 | 0.072 | 435 | 0.071 | 456 |
| 4 | 0.055 | 357 | 0.059 | 338 | 0.057 | 377 | 0.062 | 352 | 0.061 | 392 | 0.057 | 373 |

TABLE 2-continued

| Comparative Example nr | Standing time | | | | | | | | | | | |
|---|---|---|---|---|---|---|---|---|---|---|---|---|
| | fresh | | 2 h | | 34 h | | 90 h | | 168 h | | 336 h | |
| | OD | SER | OD | SER | OD | SER | OD | SER | OD | SER | OD | SER |
| 5 | 0.078 | 798 | 0.084 | 790 | 0.061 | 858 | 0.089 | 760 | 0.076 | 831 | 0.080 | 892 |
| 6 | 0.075 | 1102 | 0.081 | 1110 | 0.085 | 1094 | 0.088 | 1083 | 0.090 | 1015 | 0.070 | 1021 |
| 7 | 0.055 | 342 | 0.056 | 353 | 0.070 | 324 | 0.064 | 332 | 0.064 | 341 | 0.054 | 313 |

SER = Surface resistance in Ω/square

The results with the layers of COMPARATIVE EXAMPLES 5 and 6 show that the presence of sodium or potassium hydroxide resulted in a prohibitive increase in surface resistance over the layers of COMPARATIVE EXAMPLE 1 without sodium or potassium hydroxide. The results with the layers of COMPARATIVE EXAMPLES 2, 3 and 4 show that layers with 2-N,N-dimethylamino-ethanol, imidazole and ammonium hydroxide exhibited comparable surface resistances to the layers of COMPARATIVE EXAMPLE 1 without 2-N,N-dimethylamino-ethanol, imidazole or ammonium hydroxide. A comparison of the results with the layers of COMPARATIVE EXAMPLES 2 and 7 show that the presence of 3-glycidoxypropyl-trimethoxysilane slightly increased the surface resistance of layers with 2-N,N-dimethylamino-ethanol.

COMPARATIVE EXAMPLES 8 TO 11 AND INVENTION EXAMPLES 1 AND 2

The compositions of COMPARATIVE EXAMPLES 8 to 11 and INVENTION EXAMPLES 1 and 2 were produced by adding the ingredients given in Table 3 to the PEDOT/PSS dispersions specified in Table 3.

The compositions of COMPARATIVE EXAMPLES 8 to 11 and INVENTION EXAMPLES 1 and 2 after different standing times were coated on a 175 μm thick transparent PET sheet provided with subbing layer 1 on the side of the PET sheet being coated with a Braive coater at coating speed 2 with a barcoater giving a wet-layer thickness of 40 μm and the coatings dried for 3 minutes at 130° C. A strip 45 mm wide was cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of the fresh untreated strips was performed on two occasions during the measurements and the average recorded in Table 4 for each strip together with the appropriate standing time of the dispersion prior to coating.

The optical density measurements were carried out in transmission with a MacBeth TR924 densitometer with a visible filter with six strips with coatings and six strips without coatings to take the contribution from the support into

TABLE 3

| | Comparative Example | | | | Invention Example | |
|---|---|---|---|---|---|---|
| | 8 | 9 | 10 | 11 | 1 | 2 |
| solid PEDOT/PSS | (3.565) | (3.565) | (3.565) | (3.565) | (3.565) | (3.565) |
| diethylene glycol | 28.0 | 28.0 | 28.0 | 28.0 | 28.0 | 28.0 |
| isopropanol | 20.0 | 20.0 | 20.0 | 20.0 | 20.0 | 20.0 |
| compound 7 | — | — | — | 1.8 | 1.8 | 1.8 |
| PEDOT/PSS disp B0 | 225 | 225 | 225 | 225 | 225 | 225 |
| deionized water | 220.6 | 220.6 | 220.6 | 218.8 | 218.8 | 218.8 |
| Z6040 | 1.4 | 1.4 | 1.4 | 1.4 | 1.4 | 1.4 |
| 5 wt % aq. Zonyl ® FSO100 | 5.0 | 5.0 | 5.0 | 5.0 | 5.0 | 5.0 |
| 1M aq. imidazole | — | ca. 12 (to pH = 7.0) | — | — | 13.62 (to pH = 7.0) | — |
| 1M aq. 2-dimethyl-amino-ethanol | — | — | 6.85 (to pH = 7.0) | — | — | 8.13 (to pH = 7.0) |
| | 500 | ca. 512 | 506.85 | 500 | 513.62 | 508.13 |
| pH (initial) | 2.45 | 7.27 | 7.09 | 2.44 | 7.02 | 7.20 |
| pH (after 2 h) | 2.44 | 7.28 | 6.44 | 2.48 | 7.17 | 7.09 |
| pH (after 24 h) | 2.46 | 7.16 | 5.52 | 2.50 | 6.91 | 7.04 |
| pH (after 168 h) | 2.42 | 7.21 | 4.24 | 2.45 | 7.10 | 6.54 |
| pH (after 336 h) | 2.42 | 7.17 | 4.03 | 2.40 | 7.04 | 6.29 |
| pH (after 720 h) | 2.44 | 7.13 | 3.92 | 2.43 | 6.93 | 6.04 |
| pH (after 1440 h) | 2.37 | 7.25 | 3.84 | 2.36 | 6.88 | 5.98 | consideration and the difference divided by six to provide the optical density for a single strip recorded in Table 4. ethanol. A comparison of the results for the layers of INVENTION EXAMPLES 1 and 2 with those for the layer of COMPARATIVE EXAMPLE 11 shows that this effect is more pronounced in the presence of propyl gallate.

The compositions of COMPARATIVE EXAMPLES 12 to 14 and INVENTION EXAMPLES 3 to 5 were coated on a 175 µm thick transparent PET sheet provided with subbing layer 1 on the side of the PET sheet being coated with a Braive coater at coating speed 2 with a barcoater giving a wet-layer thickness of 40 µm and the coatings dried for 3 minutes at

TABLE 4

| | Standing time | | | | | | | | | | | | | |
|---|---|---|---|---|---|---|---|---|---|---|---|---|---|---|
| | fresh | | 2 h | | 24 h | | 168 h | | 336 h | | 720 h | | 1440 h | |
| | OD | SER* | OD | SER* | OD | SER | OD | SER* | OD | SER* | OD | SER* | OD | SER* |
| Comparative Example nr | | | | | | | | | | | | | | |
| 8 | 0.055 | 273 | 0.048 | 318 | 0.055 | 265 | 0.053 | 250 | 0.055 | 261 | 0.060 | 218 | 0.053 | 260 |
| 9 | 0.063 | 318 | 0.062 | 384 | 0.068 | 321 | 0.073 | 285 | 0.072 | 348 | 0.075 | 298 | 0.070 | 341 |
| 10 | 0.062 | 292 | 0.060 | 224 | 0.062 | 289 | 0.067 | 271 | 0.063 | 321 | 0.070 | 268 | 0.063 | 315 |
| 11 | 0.048 | 302 | 0.047 | 317 | 0.052 | 275 | 0.052 | 264 | 0.052 | 265 | 0.057 | 223 | 0.048 | 264 |
| Invention example nr. | | | | | | | | | | | | | | |
| 1 | 0.067 | 462 | 0.063 | 516 | 0.070 | 461 | 0.063 | 423 | 0.070 | 508 | 0.080 | 468 | 0.068 | 537 |
| 2 | 0.063 | 452 | 0.063 | 495 | 0.067 | 447 | 0.060 | 439 | 0.070 | 418 | 0.078 | 332 | 0.062 | 426 |

*SER = surface resistance in Ω/square

A comparison of the results for the layers of COMPARATIVE EXAMPLES 8 and 11 show that the additional presence of propyl gallate has no effect on the surface resistance observed. However, a comparison of the results for the layers of COMPARATIVE EXAMPLES 9 and 10 with those for COMPARATIVE EXAMPLE 8 shows that in the absence of propyl gallate the surface resistance of the layers is slightly increased upon addition of imidazole or 2-dimethylamino-

COMPARATIVE EXAMPLES 12 TO 14 AND INVENTION EXAMPLES 3 TO 5

The compositions of COMPARATIVE EXAMPLES 12 to 14 and INVENTION EXAMPLES 3 to 5 were produced by adding the ingredients given in Table 5 to the PEDOT/PSS dispersions specified in Table 5.

130° C. Five strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of five fresh untreated strips was performed on two occasions during the measurements and the average recorded in Table 6 for each strip together with the average of these five values.

The optical density measurements were carried out in transmission with a MacBeth TR924 densitometer with a visible filter with six strips with coatings and six strips with-

TABLE 5

| | Comparative Example | | | Invention Example | | |
|---|---|---|---|---|---|---|
| | 12 | 13 | 14 | 3 | 4 | 5 |
| solid PEDOT/PSS | 1.12 | 1.12 | (0.400} | (0.392) | (0.623) | (0.624) |
| diethylene glycol | 12.89 | — | 4.5 | 4.5 | 7.0 | 7.0 |
| isopropanol | 9.11 | 9.11 | 3.2 | 3.2 | 5.0 | 5.0 |
| compound 7 | — | — | 0.3 | 0.3 | 0.5 | 0.5 |
| PEDOT/PSS disp A0 | — | — | 36.0 | — | — | — |
| PEDOT/PSS disp A1 | — | — | — | 36.0 | — | — |
| PEDOT/PSS disp A2 | — | — | — | — | 56.3 | — |
| PEDOT/PSS disp A3 | — | — | — | — | — | 56.3 |
| deionized water | 99.57 | 112.46 | 35.0 | 35.0 | 54.7 | 54.7 |
| Z6040 | 0.62 | 0.62 | 0.2 | 0.2 | 0.3 | 0.3 |
| 5 wt % aq. Zonyl ® FSO100 | 2.34 | 2.34 | 0.8 | 0.8 | 1.3 | 1.3 |
| | 125.65 | 125.65 | 80.0 | 80.0 | 125.1 | 125.1 |
| wt % PEDOT/PSS latex | 0.89 | 0.89 | 0.50 | 0.49 | 0.5 | 0.5 |
| wt % diethylene glycol | 10.26 | — | 5.6 | 5.6 | 5.6 | 5.6 |
| wt % compound 7 | — | — | 0.375 | 0.375 | 0.400 | 0.400 |
| wt % imidazole | — | — | — | 0.89 | 0.11 | 0.086 |
| wt % Z6040 | 0.49 | 0.49 | 0.25 | 0.25 | 0.24 | 0.24 | out coatings to take the contribution from the support into consideration and the difference divided by six to provide the optical density for a single strip recorded in Table 6.

The Suntest results for the layer of COMPARATIVE EXAMPLE 14 containing a polymer comprising (3,4-dialkoxythiophene) monomer units with both diethylene glycol

TABLE 6

| | pH by adding imidazole | OD | % VLT | Surface resistance (SER) [Ω/square] | | | | | | SER × OD [Ω/square] |
|---|---|---|---|---|---|---|---|---|---|---|
| | | | | strip nr 1 | strip nr 2 | strip nr 3 | strip nr 4 | strip nr 5 | average | |
| Comparative Example nr | | | | | | | | | | |
| 12 | — | — | — | 222 | 217 | 216 | — | — | 218 | — |
| 13 | — | — | — | 12790 | 15830 | 10770 | — | — | 13130 | — |
| 14 | — | 0.048 | 89.47 | 294 | 300 | 312 | 312 | 339 | 311 | 14.9 |
| Invention Example nr. | | | | | | | | | | |
| 3 | 7.85 | 0.068 | 85.44 | 604 | 586 | 592 | 592 | 632 | 601 | 40.9 |
| 4 | 7.00 | 0.063 | 86.43 | 472 | 461 | 448 | 466 | 496 | 469 | 29.5 |
| 5 | 4.50 | 0.055 | 88.10 | 389 | 376 | 372 | 375 | 398 | 382 | 21.0 |

The more imidazole that was added the more the surface resistance of the layers was increased.

The layers of COMPARATIVE EXAMPLES 12 to 14 and INVENTION EXAMPLES 3 to 5 were subjected to a SUNTEST CPS+ from Atlas with a low pressure Xenon lamp producing 765 W/m² and having a blackstandard T of 50 C for different times, for 250 hours at a temperature of 60° C. at 95% relative humidity, or for 250 h at a temperature of 100° C. at ambient humidity respectively. The factor increase in surface resistance resulting from these stability tests are summarized in Table 7 together with the average surface resistances from Table 6 for the layers of COMPARATIVE 12 to 14 and INVENTION EXAMPLES 3 to 5 are summarized in Table 7 below.

and propyl gallate shows an increase in stability over the layers of COMPARATIVE EXAMPLE 12 or COMPARATIVE EXAMPLE 13 containing a polymer comprising (3,4-dialkoxythiophene) monomer units and diethylene glycol or propyl gellate respectively.

However, the results obtained in Suntest and the other stability tests carried out show that the layers of INVENTION EXAMPLES 3 to 5 show a surprising further strong improvement in stability for layers containing a polymer comprising (3,4-dialkoxythiophene) monomer units upon the further

TABLE 7

| | Surface resistance [Ω/square] | | | | |
|---|---|---|---|---|---|
| | fresh | increase factor after 48 h Suntest | increase factor after 96 h Suntest | increase factor after 250 h 60° C./95% RH | increase factor after 250 h 100° C. |
| Comparative Example nr | | | | | |
| 12 | 218 | 1.80 | 3.44 | 1.50* | — |
| 13 | 13130 | 2.68 | 5.19 | 0.03* | — |
| 14 | 311 | 1.48 | 1.40 | 1.28 | 1.25 |
| Invention Example nr | | | | | |
| 3 | 601 | 0.97 | 1.08 | 0.75 | 0.77 |
| 4 | 469 | 1.01 | 1.04 | 0.91 | 0.82 |
| 5 | 382 | 1.14 | 1.12 | 0.94 | 0.92 |

*336 h instead of 250 h addition of the base imidazole over and above that attained by the incorporation of diethylene glycol and propyl gallate. Although, as noted above, this is accompanied by a slight reduction in surface resistance, this slight reduction in surface resistance is considerably outweighed by the very strong improvement in Suntest stability and long term stability to heating at 100° C. and exposure to a relative humidity of 95% at 60° C.

INVENTION EXAMPLES 6

The composition of INVENTION EXAMPLE 6 was produced by adding the ingredients given in Table 8 to the PEDOT/PSS dispersions specified in Table 8.

TABLE 8

|  | Comparative Example 14 | Invention Example 6 |
| --- | --- | --- |
| solid PEDOT/PSS | (0.400} | (0.308) |
| 5 wt % aq. Zonyl ® FSO100 | 0.8 | 0.15 |
| 5 wt % aq. Synperonic A7 | — | 1.19 |
| isopropanol | 3.2 | 2.4 |
| diethylene glycol | 4.5 | 3.39 |
| Z6040 | 0.2 | 0.16 |
| compound 7 | 0.3 | 0.24 |
| PEDOT/PSS disp A0 | 36.0 | — |
| PEDOT/PSS disp B0 | — | 27.0 |
| 50 wt % aq. imidazole |  | 0.8 |
| deionized water | 35.0 | 24.77 |
|  | 80.0 | 60.1 |
| wt % PEDOT/PSS latex | 0.50 | 0.512 |
| wt % diethylene glycol | 5.6 | 5.64 |

TABLE 8-continued

|  | Comparative Example 14 | Invention Example 6 |
| --- | --- | --- |
| wt % compound 7 | 0.375 | 0.40 |
| wt % imidazole | — | 1.09 |
| wt % Z6040 | 0.25 | 0.25 |

The composition of INVENTION EXAMPLES 6 was coated on a 175 μm thick transparent PET sheet provided with subbing layer 1 on the side of the PET sheet being coated with a Braive coater at coating speed 2 with a barcoater giving a wet-layer thickness of 20 μm and the coatings dried for 3 minutes at 130° C. Five strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of five fresh untreated strips was performed on two occasions during the measurements and the average recorded in Table 9 for each strip together with the average of these five values.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 9.

TABLE 9

|  |  |  | Surface resistance (SER) [Ω/square] | | | | | | SER × OD |
| --- | --- | --- | --- | --- | --- | --- | --- | --- | --- |
|  | OD | % VLT | strip nr 1 | strip nr 2 | strip nr 3 | strip nr 4 | strip nr 5 | average | [Ω/ square] |
| Comparative Example nr |  |  |  |  |  |  |  |  |  |
| 14 | 0.048 | 89.47 | 294 | 300 | 312 | 312 | 339 | 311 | 14.9 |
| Invention Example nr |  |  |  |  |  |  |  |  |  |
| 6 | 0.030 | 93.33 | 717 | 738 | 729 | 748 | 743 | 735 | 22.0 |

The results of Table 9 showed that the addition of imidazole to the layer increased the surface resistance of the layers.

The layer of INVENTION EXAMPLE 6 was subjected to a SUNTEST CPS+ from Atlas with a low pressure Xenon lamp producing 765 W/m$^2$ and having a blackstandard T of 50 C for different times, or for 240 hours or 500 hours at a temperature of 60° C. at 95% relative humidity respectively. The factor increase in surface resistance resulting from these stability tests are summarized in Table 10 with those for COMPARATIVE EXAMPLE 14 together with the average surface resistances from Table 9 are summarized in Table 10 below.

TABLE 10

| | Surface resistance [Ω/square] | | | | |
|---|---|---|---|---|---|
| | fresh | increase factor after 48 h Suntest | increase factor after 96 h Suntest | increase factor after 240 h at 60° C./95% RH | increase factor after 500 h at 60° C./95% RH |
| Comparative Example nr | | | | | |
| 14 | 311 | 1.48 | 1.40 | 1.28 | — |
| Invention Example nr | | | | | |
| 6 | 735 | 1.09 | 1.31 | 1.00 | 1.11 |

The results in Table 10 show that the excellent stability for layers containing a polymer comprising (3,4-dialkoxythiophene) monomer units upon the further addition of the base imidazole over and above that attained by the incorporation of diethylene glycol and propyl gallate reported in Table 8 for INVENTION EXAMPLES 3 to 5 for a PEDOT/PSS-latex with a PEDOT:PSS weight ratio of 1:2.46.

COMPARATIVE EXAMPLE 15 AND INVENTION EXAMPLES 7 TO 11

The compositions of COMPARATIVE EXAMPLE 15 and INVENTION EXAMPLES 7 to 11 were produced by adding the ingredients given in Table 11 to the PEDOT/PSS dispersions specified in Table 11.

TABLE 11

| | Comparative Example | | Invention Example | | | | |
|---|---|---|---|---|---|---|---|
| | 14 | 15 | 7 | 8 | 9 | 10 | 11 |
| solid PEDOT/PSS [g] | (0.400) | (0.400) | (0.388) | (0.388) | (0.388) | (0.389) | (0.392) |
| imidazole [g] | — | — | (0.0690) | (0.0681) | (0.0674) | (0.0623) | (0.0454) |
| diethylene glycol | 4.5 | 4.5 | 4.5 | 4.5 | 4.5 | 4.5 | 4.5 |
| isopropanol | 3.2 | 3.2 | 3.2 | 3.2 | 3.2 | 3.2 | 3.2 |
| compound 7 | 0.3 | 0.3 | 0.3 | 0.3 | 0.3 | 0.3 | 0.3 |
| PEDOT/PSS disp A0 | 36.0 | 36.0 | — | — | — | — | — |
| PEDOT/PSS disp A4 pH = 4.5 | — | — | 36.0 | — | — | — | — |
| PEDOT/PSS disp A5 pH = 4.0 | — | — | — | 36.0 | — | — | — |
| PEDOT/PSS disp A6 pH = 3.5 | — | — | — | — | 36.0 | — | — |
| PEDOT/PSS disp A7 pH = 3.0 | — | — | — | — | — | 36.0 | — |

TABLE 11-continued

|  | Comparative Example | | Invention Example | | | | |
| --- | --- | --- | --- | --- | --- | --- | --- |
|  | 14 | 15 | 7 | 8 | 9 | 10 | 11 |
| PEDOT/PSS disp A8 pH = 2.5 | — | — | — | — | — | — | 36.0 |
| deionized water | 35.0 | 35.0 | 35.0 | 35.0 | 35.0 | 35.0 | 35.0 |
| Z6040 | 0.2 | 0.2 | 0.2 | 0.2 | 0.2 | 0.2 | 0.2 |
| 5 wt % aq. Zonyl ® FSO100 | 0.8 | 0.8 | 0.8 | 0.8 | 0.8 | 0.8 | 0.8 |
|  | 80.0 | 80.0 | 80.0 | 80.0 | 80.0 | 80.0 | 80.0 |
| wt % PEDOT/PSS | 0.50 | 0.50 | 0.48 | 0.48 | 0.48 | 0.49 | 0.49 |
| wt % DEG | 5.6 | 5.6 | 5.6 | 5.6 | 5.6 | 5.6 | 5.6 |
| wt % compound 7 | 0.375 | 0.375 | 0.375 | 0.375 | 0.375 | 0.375 | 0.375 |
| wt % imidazole | — | — | 0.086 | 0.085 | 0.084 | 0.078 | 0.057 |
| wt % Z6040 | 0.25 | 0.25 | 0.25 | 0.25 | 0.25 | 0.25 | 0.25 |
| pH | 2.11 | 2.11 | 4.55 | 4.2 | 3.47 | 3.02 | 2.48 |

The compositions of COMPARATIVE EXAMPLE 15 and INVENTION EXAMPLES 7 to 11 were coated on a 175 μm thick transparent PET sheet provided with subbing layer 1 on the side of the PET sheet being coated with a Braive coater at coating speed 2 with a barcoater giving a wet-layer thickness of 40 μm and the coatings dried for 3 minutes at 130° C. Five strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of five fresh untreated strips was performed on two occasions during the measurements and the average recorded in Table 12 for each strip together with the average of these five values.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 12.

TABLE 12

|  | pH by adding imidazole | OD | % VLT | Surface resistance (SER) [Ω/square] | | | | | | SER × OD [Ω/square] |
| --- | --- | --- | --- | --- | --- | --- | --- | --- | --- | --- |
|  |  |  |  | strip nr 1 | strip nr 2 | strip nr 3 | strip nr 4 | strip nr 5 | average |  |
| Comparative Example nr. |  |  |  |  |  |  |  |  |  |  |
| 14 | — | 0.048 | 89.47 | 294 | 300 | 312 | 312 | 339 | 311 | 14.9 |
| 15 | — | 0.0566 | 87.77 | 242 | 243 | 241 | 254 | 248 | 246 | 13.9 |
| Invention Example nr |  |  |  |  |  |  |  |  |  |  |
| 7 | 4.55 | 0.0666 | 85.77 | 324 | 318 | 318 | 323 | 344 | 325 | 21.6 |
| 8 | 4.2 | 0.0650 | 86.10 | 323 | 313 | 316 | 324 | 339 | 323 | 21.0 |
| 9 | 3.47 | 0.0666 | 85.77 | 323 | 320 | 325 | 336 | 350 | 331 | 22.0 |
| 10 | 3.02 | 0.0666 | 85.77 | 347 | 335 | 334 | 341 | 353 | 342 | 22.8 |
| 11 | 2.48 | 0.0617 | 86.76 | 439 | 433 | 422 | 433 | 455 | 436 | 26.9 |

The increase in surface resistance upon addition of imidazole to layers containing a polymer comprising (3,4-dialkoxythiophene) monomer units and a polyanion, diethylene glycol and propyl gallate appears to be a minimum upon addition of imidazole to give a pH of 4.2.

The layers of COMPARATIVE EXAMPLE 15 and INVENTION EXAMPLES 7 to 11 were subjected to a SUNTEST CPS+ from Atlas with a low pressure Xenon lamp producing 765 W/m$^2$ and having a blackstandard T of 50 C for different times, or for 240 hours or 500 hours at a temperature of 60° C. at 95% relative humidity respectively. The factor increase in surface resistance resulting from these stability tests are summarized in Table 13 together with the average surface resistances from Table 6 for the layers of COMPARATIVE EXAMPLES 14 and 15 and INVENTION EXAMPLES 7 to 11 are summarized in Table 13 below.

TABLE 13

| | | Surface resistance [Ω/square] | | | |
|---|---|---|---|---|---|
| | fresh | increase factor after 48 h Suntest | increase factor after 96 h Suntest | increase factor after 240 h 60° C./95% RH | increase factor after 500 h 60° C./95% RH |
| Comparative Example nr. | | | | | |
| 14 | 311 | 1.48 | 1.40 | 1.28 | 1.25 |
| 15 | 246 | 1.18 | 1.32 | 1.26 | 1.26 |
| Invention Example nr | | | | | |
| 7 | 325 | 0.97 | 1.03 | 0.94 | 0.94 |
| 8 | 323 | 0.98 | 1.06 | 0.91 | 0.94 |
| 9 | 331 | 0.95 | 1.08 | 0.92 | 0.90 |
| 10 | 342 | 0.98 | 1.00 | 0.91 | 0.94 |
| 11 | 436 | 0.98 | 1.11 | 0.92 | 0.91 |

There is no significant difference in stability between the layers containing a polymer comprising (3,4-dialkoxythiophene) monomer units and a polyanion, diethylene glycol, propyl gallate and imidazole of INVENTION EXAMPLES 7 to 11 with concentrations of imidazole in the coating dispersions of 0.057 to 0.086 wt % or 0.446 to 0.684 moles of imidazole/mole PSS.

COMPARATIVE EXAMPLES 16 AND 17 AND INVENTION EXAMPLES 12 TO 14

The compositions of COMPARATIVE EXAMPLES 16 and 17 and INVENTION EXAMPLES 12 to 14 were produced by adding the ingredients given in Table 14 to the PEDOT/PSS dispersions specified in Table 14.

TABLE 14

| | Comparative Example | | Invention Example | | |
|---|---|---|---|---|---|
| | 16 | 17 | 12 | 13 | 14 |
| solid PEDOT/PSS [g] | (0.195) | (0.195) | (0.190) | (0.189) | (0.188) |
| imidazole [g] | — | — | (0.0306) | (0.0344) | (0.0432) |
| 2-pyrrolidone | 0.9 | 0.9 | 0.9 | 0.9 | 0.9 |
| 5 wt % aq. Zonyl ® FSO100 | 2.0 | 2.0 | 2.0 | 2.0 | 2.0 |
| compound 7 | — | 0.2 | 0.2 | 0.2 | 0.2 |
| PEDOT/PSS disp C0 | 17.28 | 17.28 | — | — | — |
| PEDOT/PSS disp C1 pH = 3.0 | — | — | 17.28 | — | — |
| PEDOT/PSS disp C2 pH = 5.0 | — | — | — | 17.28 | — |
| PEDOT/PSS disp C3 pH = 7.0 | — | — | — | — | 17.28 |
| deionized water | 179.82 | 179.62 | 179.62 | 179.62 | 179.62 |
| | 200.00 | 200.00 | 200.00 | 200.00 | 200.00 |
| wt % PEDOT/PSS latex | 0.097 | 0.097 | 0.095 | 0.095 | 0.094 |
| wt % 2-pyrrolidone | 0.45 | 0.45 | 0.45 | 0.45 | 0.45 |
| wt % compound 7 | — | 0.1 | 0.1 | 0.1 | 0.1 |
| wt % imidazole | — | — | 0.0153 | 0.0172 | 0.0216 |
| pH | | | 3.0 | 5.0 | 7.0 |

The compositions of COMPARATIVE EXAMPLES 16 and 17 and INVENTION EXAMPLES 12 to 14 were coated on a 175 µm thick transparent PET sheet provided with subbing layer 1 on the side of the PET sheet being coated with a Braive coater at coating speed 2 with a barcoater giving a wet-layer thickness of 12 µm and the coatings dried for 3 minutes at 130° C. Five strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of five fresh untreated strips was performed on two occasions during the measurements and the average recorded in Table 15 for each strip together with the average of these five values.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 15.

TABLE 15

| | imidazole added pH | OD | % VLT | Surface resistance (SER) [Ω/square] | | | | | |
|---|---|---|---|---|---|---|---|---|---|
| | | | | strip nr 1 | strip nr 2 | strip nr 3 | strip nr 4 | strip nr 5 | average |
| Comparative Example nr. | | | | | | | | | |
| 16 | — | 0.003 | 99.24 | 66825 | 67650 | 71700 | 70500 | 57450 | 66825 |
| 17 | — | 0.003 | 99.24 | 35063 | 34700 | 34850 | 36000 | 34700 | 35063 |
| Invention Example nr | | | | | | | | | |
| 12 | 3.0 | 0.003 | 99.24 | 53538 | 82800 | 50550 | 42600 | 38200 | 53538 |
| 13 | 5.0 | 0.003 | 99.24 | 229313 | 323000 | 241500 | 185150 | 167600 | 229313 |
| 14 | 7.0 | 0.003 | 99.24 | 749375 | 1033000 | 652500 | 494000 | 818000 | 749375 |

The surface resistance upon addition of imidazole to layers containing a polymer comprising (3,4-dialkoxythiophene) monomer units and a polyanion, diethylene glycol and propyl gallate increases strongly above a pH of 3.0. Lower surface resistances were obtained upon coating the same dispersions at higher wet layer thicknesses that 12 μm as shown in Table 16 below.

TABLE 16

| | 20 μm wet layer thickness | | | 30 μm wet layer thickness | | | 40 μm wet layer thickness | | |
|---|---|---|---|---|---|---|---|---|---|
| | OD | SER* | SER* × OD | OD | SER* | SER* × OD | OD | SER* | SER* × OD |
| Comparative Example nr. | | | | | | | | | |
| 16 | 0.0050 | 12090 | 60.4 | 0.010 | 4900 | 49.0 | 0.0117 | 2305 | 27.0 |
| 17 | 0.0067 | 8520 | 57.1 | 0.010 | 3700 | 37.0 | 0.0117 | 2320 | 27.1 |
| Invention Example nr | | | | | | | | | |
| 12 | 0.0083 | 14285 | 118.6 | 0.0117 | 9400 | 110.0 | 0.0117 | 4805 | 56.2 |
| 13 | 0.0083 | 33000 | 273.9 | 0.0133 | 12650 | 168.2 | 0.0133 | 7600 | 101.1 |
| 14 | 0.0063 | 57100 | 359.7 | 0.0117 | 18850 | 220.5 | 0.0133 | 7765 | 103.3 |

*SER = surface resistance in Ω/square

The layers of COMPARATIVE EXAMPLES 16 and 17 and INVENTION EXAMPLES 12 to 14 were subjected to a SUNTEST CPS+ from Atlas with a low pressure Xenon lamp producing 765 W/m$^2$ and having a blackstandard T of 50 C for different times, or for 240 hours or 500 hours at a temperature of 60° C. at 95% relative humidity respectively. The factor increase in surface resistance resulting from these stability tests are summarized in Table 17 together with the average surface resistances from Table 15 for the layers of COMPARATIVE EXAMPLES 16 and 17 and INVENTION EXAMPLES 12 to 14 are summarized in Table 17 below.

TABLE 17

| | Surface resistance [Ω/square] | | | | |
|---|---|---|---|---|---|
| | fresh | increase factor after 48 h Suntest | increase factor after 96 h Suntest | increase factor after 240 h 60° C./95% RH | increase factor after 500 h 60° C./95% RH |
| Comparative Example nr. | | | | | |
| 16 | 66825 | 256.95 | — | 2.78 | 6.65 |
| 17 | 35063 | 11.85 | 220.75 | 0.94 | 1.48 |
| Invention Example nr | | | | | |
| 12 | 53538 | 10.26 | 69.08 | 0.65 | 1.45 |
| 13 | 229313 | 26.73 | — | 0.26 | 0.61 |
| 14 | 749375 | 40.49 | — | 0.14 | 0.39 |

The results in Table 17 show that the stability of layers comprising (3,4-dialkoxythiophene) monomer units and a polyanion, 2-pyrrolidone, propyl gallate and imidazole of INVENTION EXAMPLES 12 to 14 is significantly higher than the layer of COMPARATIVE EXAMPLE 17 comprising (3,4-dialkoxythiophene) monomer units and a polyanion, 2-pyrrolidone, and propyl gallate or the layer of COMPARATIVE EXAMPLE 16 comprising (3,4-dialkoxythiophene) monomer units and a polyanion and 2-pyrrolidone.

COMPARATIVE EXAMPLES 18 TO 21 AND INVENTION EXAMPLES 15 AND 16

The compositions of COMPARATIVE EXAMPLES 18 to 21 and INVENTION EXAMPLES 15 and 16 were produced by adding the ingredients given in Table 18 to the PEDOT/PSS dispersions specified in Table 18.

trodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of five fresh untreated strips was performed on two occasions during the measurements and the average recorded in Table 19 for each strip together with the average of these five values.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 19.

A comparison of the surface resistances for the layers of INVENTION EXAMPLE 15 with that of COMPARATIVE EXAMPLE 19 or INVENTION EXAMPLE 16 with that of

TABLE 18

|  | Comparative Example | | | | Invention Example | |
| --- | --- | --- | --- | --- | --- | --- |
|  | 18 | 19 | 20 | 21 | 15 | 16 |
| diethylene glycol | 5.70 | 5.70 | 5.7 | 5.7 | 5.7 | 5.7 |
| PEDOT/PSS disp A0 | 45.00 | 45.00 | 45.00 | 45.00 | 45.00 | 45.00 |
| 5 wt % aq. Zonyl ® FSO100 | 1.0 | 1.0 | 1.0 | 1.0 | 1.0 | 1.0 |
| 1M aq. imidazole | — | 2.01 | — | — | 1.95 | — |
| 1M aq. 2-dimethyl-aminoethanol | — | — | 1.37 | — | — | 1.38 |
| compound 5 | — | — | — | 0.35 | 0.35 | 0.35 |
| deionized water | 48.30 | 46.29 | 46.93 | 47.95 | 46.00 | 46.57 |
|  | 100.00 | 100.00 | 100.00 | 100.00 | 100.00 | 100.00 |
| wt % PEDOT/PSS latex | 0.50 | 0.50 | 0.50 | 0.50 | 0.50 | 0.50 |
| wt % diethylene glycol | 5.70 | 5.70 | 5.70 | 5.70 | 5.70 | 5.70 |
| wt % compound 5 | — | — | — | 0.35 | 0.35 | 0.35 |
| wt % imidazole | — | 0.137 | — | — | 0.133 | — |
| wt % 2-dimethylamino-ethanol | — | — | 0.122 | — | — | 0.123 |
| pH | 2.32 | 7.22 | 6.69 | 2.34 | 6.84 | 4.84 |

The compositions of COMPARATIVE EXAMPLES 18 to 21 and INVENTION EXAMPLES 15 and 16 were coated on a 175 μm thick transparent PET sheet provided with subbing layer 1 on the side of the PET sheet being coated with a Braive coater at coating speed 2 with a barcoater giving a wet-layer thickness of 12 μm and the coatings dried for 3 minutes at 130° C. Five strips 45 mm wide were cut from the middle of the coated sheet for surface resistance experiments.

The surface resistances at room temperature were determined by contacting the outermost layer with parallel elec- COMPARATIVE EXAMPLE 20, shows that the surface resistance increased upon addition of methyl gallate to layers containing a polymer comprising (3,4-dialkoxythiophene) monomer units and a polyanion, diethylene glycol and imidazole or 2-dimethylamino-ethanol. The surface resistance also increased upon addition of methyl gallate to layers containing a polymer comprising (3,4-dialkoxythiophene) monomer units and a polyanion and diethylene glycol, as can be seen by comparing the surface resistances of the layers of COMPARATIVE EXAMPLES 21 and 18.

TABLE 19

|  |  |  | Surface resistance (SER) [Ω/square] | | | | | | SER × OD |
| --- | --- | --- | --- | --- | --- | --- | --- | --- | --- |
|  | OD | % VLT | strip nr 1 | strip nr 2 | strip nr 3 | strip nr 4 | strip nr 5 | average | [Ω/square] |
| Comparative Example nr |  |  |  |  |  |  |  |  |  |
| 18 | 0.058 | 87.43 | 225 | 209 | 202 | 202 | 194 | 206 | 11.9 |
| 19 | 0.075 | 84.14 | 268 | 251 | 250 | 251 | 251 | 254 | 19.0 |
| 20 | 0.067 | 85.77 | 222 | 227 | 230 | 216 | 205 | 220 | 14.7 |
| 21 | 0.060 | 87.10 | 210 | 211 | 214 | 215 | 207 | 211 | 12.7 |

TABLE 19-continued

| | | | Surface resistance (SER) [Ω/square] | | | | | | SER × OD |
|---|---|---|---|---|---|---|---|---|---|
| | OD | % VLT | strip nr 1 | strip nr 2 | strip nr 3 | strip nr 4 | strip nr 5 | average | [Ω/square] |
| Invention Example nr | | | | | | | | | |
| 15 | 0.073 | 84.46 | 353 | 349 | 355 | 352 | 336 | 349 | 25.5 |
| 16 | 0.067 | 85.77 | 288 | 288 | 293 | 290 | 293 | 290 | 19.4 |

The layers of COMPARATIVE EXAMPLES 18 to 21 and INVENTION EXAMPLES 15 and 16 were subjected to a SUNTEST CPS+ from Atlas with a low pressure Xenon lamp producing 765 W/m$^2$ and having a blackstandard T of 50 C for different times or for 240 hours or 500 hours at a temperature of 60° C. at 95% relative humidity respectively. The factor increase in surface resistance resulting from these stability tests are summarized in Table 20 together with the average surface resistances from Table 19 for the layers of COMPARATIVE EXAMPLES 18 to 21 and INVENTION EXAMPLES 15 and 16 are summarized in Table 20 below.

TABLE 20

| | Surface resistance [Ω/square] | | | | |
|---|---|---|---|---|---|
| | fresh | increase factor after 48 h Suntest | increase factor after 96 h Suntest | increase factor after 240 h 60° C./95% RH | increase factor after 500 h 60° C./95% RH |
| Comparative Example nr | | | | | |
| 18 | 206 | 1.77 | 4.00 | 1.35 | 1.49 |
| 19 | 254 | 1.60 | 2.02 | 1.00 | 1.15 |
| 20 | 220 | 1.94 | 2.40 | 1.12 | 1.30 |
| 21 | 211 | 1.30 | 1.38 | 1.20 | 1.30 |
| Invention Example nr | | | | | |
| 15 | 349 | 0.90 | 1.02 | 0.77 | 0.80 |
| 16 | 290 | 1.11 | 1.08 | 0.91 | 0.99 |

The results in Table 20 show a significant improvement in the stability of the surface resistances of layers surface resistance stability that the excellent stability for layers comprising a polymer comprising (3,4-dialkoxythiophene) monomer units and an anion, diethylene glycol and a base such as imidazole or 2-dimethylamino-ethanol upon addition of methyl gallate.

COMPARATIVE EXAMPLES 22 TO 25 AND INVENTION EXAMPLES 17 AND 18

The compositions of COMPARATIVE EXAMPLES 22 to 25 and INVENTION EXAMPLES 17 and 18 were produced by adding the ingredients given in Table 21 to the PEDOT/PSS dispersions specified in Table 21.

TABLE 21

| | Comparative Example | | | | Invention Example | |
|---|---|---|---|---|---|---|
| | 22 | 23 | 24 | 25 | 17 | 18 |
| diethylene glycol | 5.70 | 5.70 | 5.7 | 5.7 | 5.7 | 5.7 |
| PEDOT/PSS disp A0 | 45.00 | 45.00 | 45.00 | 45.00 | 45.00 | 45.00 |
| 5 wt % aq. Zonyl ® FSO100 | 1.0 | 1.0 | 1.0 | 1.0 | 1.0 | 1.0 |
| pyridine | — | 3.01 | — | — | 4.70 | — |
| 10 wt % aq. 1,8-di-azabicyclo- | — | — | 2.36 | — | — | 2.35 |

TABLE 21-continued

|  | Comparative Example | | | | Invention Example | |
| --- | --- | --- | --- | --- | --- | --- |
|  | 22 | 23 | 24 | 25 | 17 | 18 |
| [5.4.0]undec-7-ene(DBU) |  |  |  |  |  |  |
| compound 5 | — | — | — | 0.35 | 0.35 | 0.35 |
| deionized water | 48.30 | 44.93 | 45.94 | 47.95 | 43.25 | 45.60 |
|  | 100.00 | 100.00 | 100.00 | 100.00 | 100.00 | 100.00 |
| wt % PEDOT/PSS latex | 0.50 | 0.50 | 0.50 | 0.50 | 0.50 | 0.50 |
| wt % diethylene glycol | 5.70 | 5.70 | 5.70 | 5.70 | 5.70 | 5.70 |
| wt % compound 5 | — | — | — | 0.35 | 0.35 | 0.35 |
| wt % pyridine | — | 3.01 | — | — | 4.70 | — |
| wt % DBU | — | — | 0.236 | — | — | 0.235 |
| pH | — | 7.00 | 6.82 | 2.18 | 7.00 | 4.80 |

The compositions of COMPARATIVE EXAMPLES 22 to 25 and INVENTION EXAMPLES 17 and 18 were coated on a 175 μm thick transparent PET sheet provided with subbing layer 1 on the side of the PET sheet being coated with a Braive coater at coating speed 2 with a barcoater giving a wet-layer thickness of 12 μm and the coatings dried for 3 minutes at 130° C. Five strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of five fresh untreated strips was performed on two occasions during the measurements and the average recorded in Table 22 for each strip together with the average of these five values.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 22.

A comparison of the surface resistances for the layers of INVENTION EXAMPLE 17 with that of COMPARATIVE EXAMPLE 23 or INVENTION EXAMPLE 18 with that of COMPARATIVE EXAMPLE 24, shows that the surface resistance increased upon addition of methyl gallate to layers containing a polymer comprising (3,4-dialkoxythiophene) monomer units and a polyanion, diethylene glycol and pyridine or 1,8-diazabicyclo[5.4.0]undec-7-ene (DBU). The surface resistance also increased upon addition of methyl gallate to layers containing a polymer comprising (3,4-dialkoxythiophene) monomer units and a polyanion and diethylene glycol, as can be seen by comparing the surface resistances of the layers of COMPARATIVE EXAMPLES 25 and 22. Moreover, with pyridine the increase in surface resistance upon addition of a base is much reduced over the situation with imidazole, 2-dimethylamino-ethanol or DBU.

The layers of COMPARATIVE EXAMPLES 22 to 25 and INVENTION EXAMPLES 17 and 18 were subjected to a SUNTEST CPS+ from Atlas with a low pressure Xenon lamp producing 765 W/m$^2$ and having a blackstandard T of 50 C for different times or for 240 hours or 500 hours at a temperature of 60° C. at 95% relative humidity respectively. The factor increase in surface resistance resulting from these stability tests are summarized in Table 23 together with the average surface resistances from Table 22 for the layers of COMPARATIVE EXAMPLES 22 to 25 and INVENTION EXAMPLES 17 and 18 are summarized in Table 23 below.

TABLE 22

|  |  |  | Surface resistance (SER) [Ω/square] | | | | | | SER × OD |
| --- | --- | --- | --- | --- | --- | --- | --- | --- | --- |
|  | OD | % VLT | strip nr 1 | strip nr 2 | strip nr 3 | strip nr 4 | strip nr 5 | average | [Ω/ square] |
| Comparative Example nr |  |  |  |  |  |  |  |  |  |
| 22 | 0.058 | 87.43 | 218 | 213 | 215 | 212 | 213 | 214 | 12.4 |
| 23 | 0.065 | 86.10 | 215 | 219 | 219 | 218 | 217 | 218 | 14.2 |
| 24 | 0.077 | 83.82 | 316 | 309 | 301 | 305 | 314 | 309 | 23.8 |
| 25 | 0.058 | 87.43 | 221 | 221 | 217 | 213 | 222 | 219 | 12.7 |
| Invention Example nr |  |  |  |  |  |  |  |  |  |
| 17 | 0.063 | 86.43 | 270 | 248 | 249 | 243 | 255 | 253 | 15.9 |
| 18 | 0.073 | 84.46 | 342 | 348 | 344 | 339 | 345 | 344 | 25.1 |

TABLE 23

| | | Surface resistance [Ω/square] | | | |
|---|---|---|---|---|---|
| | fresh | increase factor after 48 h Suntest | increase factor after 96 h Suntest | increase factor after 240 h 60° C./95% RH | increase factor after 500 h 60° C./95% RH |
| Comparative Example nr. | | | | | |
| 22 | 214 | 1.79 | 3.20 | 1.25 | 1.47 |
| 23 | 218 | 1.86 | 2.46 | 1.21 | 1.32 |
| 24 | 309 | 1.86 | 1.80 | 1.09 | 1.24 |
| 25 | 219 | 1.28 | 1.40 | 1.17 | 1.27 |
| Invention Example nr | | | | | |
| 17 | 253 | 1.08 | — | 1.04 | 1.12 |
| 18 | 344 | 1.01 | 1.06 | 0.82 | 0.88 |

The results in Table 23 show a significant improvement in the stability of the surface resistances of layers surface resistance stability that the excellent stability for layers containing a polymer comprising (3,4-dialkoxythiophene) monomer units and an anion, diethylene glycol and a base such as pyridine or 1,8-diazabicyclo[5.4.0]undec-7-ene (DBU) upon addition of methyl gallate.

COMPARATIVE EXAMPLES 26 TO 33 AND INVENTION EXAMPLES 19 TO 24

The compositions of COMPARATIVE EXAMPLES 26 to 33 and INVENTION EXAMPLES 19 to 24 were produced by adding the ingredients given in Tables 24 and 25 respectively to the PEDOT/PSS dispersions specified in Tables 24 and 25. The concentration of the different amino-compounds or heterocyclic compounds with at least one ring nitrogen atom with the exception of phenyl mercaptotetrazole were approximately equimolar to the PSS in the PEDOT/PSS-latex.

TABLE 24

| | Comparative Example | | | | | | | |
|---|---|---|---|---|---|---|---|---|
| | 26 | 27 | 28 | 29 | 30 | 31 | 32 | 33 |
| diethylene glycol | 5.70 | 5.7 | 5.7 | 5.70 | 5.7 | 5.7 | 5.70 | 5.7 |
| PEDOT/PSS disp A0 | 45.00 | 45.00 | 45.00 | 45.00 | 45.00 | 45.00 | 45.00 | 45.00 |
| 5 wt % aq. Zonyl ® FSO100 | 1.0 | 1.0 | 1.0 | 1.0 | 1.0 | 1.0 | 1.0 | 1.0 |
| 1M aq. imidazole | — | 2.01 | — | — | — | — | — | — |
| 1M aq 2-dimethylamino-ethanol (DMAE) | — | — | 2.00 | — | — | — | — | — |
| 10.4 wt % benztriazole solution in methanol | — | — | — | 2.05 | — | — | — | — |
| 0.1 wt % solution of PMT (phenylmercaptotetrazole) in aqueous ethanol | — | — | — | — | 48.30 | — | — | — |
| pyridine | — | — | — | — | — | 0.16 | — | — |
| 4.25 wt % aqueous NH$_4$OH | — | — | — | — | — | — | — | 0.81 |
| compound 5 | — | — | — | — | — | — | 0.35 | — |
| deionized water | 48.30 | 46.29 | 46.30 | 46.25 | 0.00 | 48.14 | 47.95 | 47.49 |
| | 100.0 | 100.0 | 100.0 | 100.0 | 100.0 | 100.0 | 100.0 | 100.0 |
| wt % PEDOT/PSS | 0.50 | 0.50 | 0.50 | 0.50 | 0.50 | 0.50 | 0.50 | 0.50 |
| wt % diethylene glycol | 5.70 | 5.70 | 5.70 | 5.70 | 5.70 | 5.70 | 5.70 | 5.70 |
| wt % compound 5 | — | — | — | — | — | — | 0.35 | — |
| wt % imidazole | — | 0.137 | — | — | — | — | — | — |
| wt % DMAE | — | — | 0.178 | — | — | — | — | — |
| wt % benztriazole | — | — | — | 0.213 | — | — | — | — |
| wt % PMT | — | — | — | — | 0.048 | — | — | — |
| wt % pyridine | — | — | — | — | — | 0.16 | — | — |
| wt % NH$_4$OH | — | — | — | — | — | — | — | 0.0344 |
| pH | 2.11 | 7.09 | 9.29 | 2.13 | 2.33 | 5.40 | 2.16 | 9.12 |

TABLE 25

|  | Invention Example | | | | | |
|---|---|---|---|---|---|---|
|  | 19 | 20 | 21 | 22 | 23 | 24 |
| diethylene glycol | 5.7 | 5.7 | 5.70 | 5.7 | 5.7 | 5.7 |
| PEDOT/PSS disp A0 | 45.00 | 45.00 | 45.00 | 45.00 | 45.00 | 45.00 |
| 5 wt % aq. Zonyl ® FSO100 | 1.0 | 1.0 | 1.0 | 1.0 | 1.0 | 1.0 |
| 1M aq. imidazole | 2.01 | — | — | — | — | — |
| 1M aq. 2-dimethylamino-ethanol | — | 2.00 | — | — | — | — |
| benztriazole | — | — | 2.05 | — | — | — |
| phenylmercaptotetrazole | — | — | — | 48.30 | — | — |
| pyridine | — | — | — | — | 0.16 | — |
| 30 wt % aqueous $NH_4OH$ | — | — | — | — | — | 0.81 |
| compound 5 | 0.35 | 0.35 | 0.35 | 0.35 | 0.35 | 0.35 |
| deionized water | 45.94 | 45.95 | 45.90 | −0.35 | 47.79 | 47.14 |
|  | 100.0 | 100.0 | 100.0 | 100.0 | 100.0 | 100.0 |
| wt % PEDOT/PSS | 0.50 | 0.50 | 0.50 | 0.50 | 0.50 | 0.50 |
| wt % DEG | 5.70 | 5.70 | 5.70 | 5.70 | 5.70 | 5.70 |
| wt % compound 5 | 0.35 | 0.35 | 0.35 | 0.35 | 0.35 | 0.35 |
| wt % imidazole | 0.137 | — | — | — | — | — |
| wt % DMAE | — | 0.178 | — | — | — | — |
| wt % benztriazole | — | — | 0.238 | — | — | — |
| wt % PMT | — | — | — | 0.048 | — | — |
| wt % pyridine | — | — | — | — | 0.16 | — |
| wt % $NH_4OH$ | — | — | — | — | — | 0.0344 |
| pH | 6.93 | 7.66 | 2.21 | 2.30 | 5.43 | 7.28 |

The compositions of COMPARATIVE EXAMPLES 26 to 33 and INVENTION EXAMPLES 19 to 24 were coated on a 175 μm thick transparent PET sheet provided with subbing layer 1 on the side of the PET sheet being coated with a Braive coater at coating speed 2 with a barcoater giving a wet-layer thickness of 12 μm and the coatings dried for 3 minutes at 130° C. Five strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each of five fresh untreated strips was performed on two occasions during the measurements and the average recorded in Table 26 for each strip together with the average of these five values.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 26.

A comparison of the surface resistances for the layers of INVENTION EXAMPLES 19, 20 and 23 with those of COMPARATIVE EXAMPLE 27, 28 and 31 respectively shows that the surface resistance increased upon addition of methyl gallate to layers containing a polymer comprising (3,4-dialkoxythiophene) monomer units and a polyanion, diethylene glycol and imidazole, 2-dimethylamino-ethanol or pyridine. The surface resistance also increased upon addition of methyl gallate to layers containing a polymer comprising (3,4-dialkoxythiophene) monomer units and a polyanion and diethylene glycol, as can be seen by comparing the surface resistances of the layers of COMPARATIVE EXAMPLES 26 and 32. Moreover, with pyridine the increase in surface resistance upon addition of a base is much reduced over the situation with imidazole and 2-dimethylamino-ethanol.

TABLE 26

|  |  |  | Surface resistance (SER) [Ω/square] | | | | | | SER × OD |
|---|---|---|---|---|---|---|---|---|---|
|  | OD | % VLT | strip nr 1 | strip nr 2 | strip nr 3 | strip nr 4 | strip nr 5 | average | [Ω/square] |
| Comparative Example nr. |  |  |  |  |  |  |  |  |  |
| 26 | 0.060 | 87.10 | 217 | 202 | 204 | 201 | 197 | 204 | 12.2 |
| 27 | 0.075 | 84.14 | 277 | 265 | 267 | 266 | 261 | 267 | 20.0 |
| 28 | 0.075 | 84.14 | 276 | 266 | 276 | 272 | 264 | 271 | 20.3 |
| 29 | 0.062 | 86.76 | 222 | 218 | 225 | 221 | 219 | 221 | 13.7 |
| 30 | 0.057 | 87.77 | 227 | 229 | 227 | 224 | 223 | 226 | 12.9 |
| 31 | 0.063 | 86.43 | 217 | 208 | 207 | 206 | 207 | 209 | 13.2 |
| 32 | 0.060 | 87.10 | 222 | 221 | 219 | 219 | 218 | 220 | 13.2 |
| 33 | 0.068 | 85.44 | 252 | 251 | 238 | 237 | 247 | 245 | 16.7 |

TABLE 26-continued

| | | | Surface resistance (SER) [Ω/square] | | | | | | SER × OD |
|---|---|---|---|---|---|---|---|---|---|
| | OD | % VLT | strip nr 1 | strip nr 2 | strip nr 3 | strip nr 4 | strip nr 5 | average | [Ω/square] |
| Invention Example nr. | | | | | | | | | |
| 19 | 0.078 | 83.50 | 389 | 367 | 371 | 347 | 376 | 370 | 28.9 |
| 20 | 0.082 | 82.86 | 523 | 504 | 499 | 466 | 486 | 496 | 40.7 |
| 21 | 0.058 | 87.43 | 235 | 236 | 229 | 231 | 227 | 232 | 13.4 |
| 22 | 0.060 | 87.10 | 228 | 224 | 225 | 228 | 224 | 226 | 13.6 |
| 23 | 0.065 | 86.10 | 242 | 238 | 237 | 214 | 229 | 232 | 15.1 |
| 24 | 0.073 | 84.46 | 380 | 382 | 379 | 363 | 361 | 373 | 27.2 |

There is no such increase in surface resistance upon the incorporation of methyl gallate to layers containing a polymer comprising (3,4-dialkoxythiophene) monomer units and a polyanion, diethylene glycol and benztriazole or 1-phenyl-mercaptotetrazole, see INVENTION EXAMPLES 21 and 22 and COMPARATIVE EXAMPLES 29 and 30.

The layers of COMPARATIVE EXAMPLES 26 to 33 and INVENTION EXAMPLES 19 to 24 were subjected to a SUNTEST CPS+ from Atlas with a low pressure Xenon lamp producing 765 W/m² and having a blackstandard T of 50 C for different times or for 240 hours or 500 hours at a temperature of 60° C. at 95% relative humidity respectively. The factor increase in surface resistance resulting from these stability tests are summarized in Table 27 together with the average surface resistances from Table 26 for the layers of COMPARATIVE EXAMPLES 26 to 33 and INVENTION EXAMPLES 19 to 24 are summarized in Table 27 below.

The results in Table 27 show a significant improvement in the stability of the surface resistances of layers surface resistance stability that the excellent stability for layers containing a polymer comprising (3,4-dialkoxythiophene) monomer units and an anion, diethylene glycol and a base such as imidazole, 2-dimethylamino-ethanol, benztriazole, 1-phenyl-mercaptotetrazole, pyridine or ammonium hydroxide upon addition of methyl gallate.

INVENTION EXAMPLES 25 TO 28 AND COMPARATIVE EXAMPLES 34 TO 38

The 0.53% by weight PEDOT/PSS compositions of COMPARATIVE EXAMPLE INVENTION 34, COMPARATIVE EXAMPLES 35 to 38 and INVENTION EXAMPLES 25 to 28 were produced by adding the ingredients given in Table 28 to the dispersions specified in Table 28.

TABLE 27

| | Surface resistance [Ω/square] | | | | |
|---|---|---|---|---|---|
| | fresh | increase factor after 48 h Suntest | increase factor after 96 h Suntest | increase factor after 240 h 60° C./95% RH | increase factor after 500 h 60° C./95% RH |
| Comparative Example nr. | | | | | |
| 26 | 204 | 2.17 | 2.80 | 1.44 | 1.48 |
| 27 | 267 | 1.38 | 1.84 | 1.00 | 1.04 |
| 28 | 271 | 1.47 | 1.92 | 1.00 | 1.04 |
| 29 | 221 | 1.92 | 5.40 | 1.25 | 1.34 |
| 30 | 226 | 1.54 | 2.87 | 1.26 | 1.47 |
| 31 | 209 | 1.66 | 3.33 | 1.23 | 1.36 |
| 32 | 220 | 1.09 | 1.50 | 1.22 | 1.20 |
| 33 | 245 | 1.72 | 2.89 | 1.11 | 1.37 |
| Invention Example nr | | | | | |
| 19 | 370 | 0.89 | 0.80 | 0.79 | 0.72 |
| 20 | 496 | 0.89 | 0.83 | 0.61 | 0.59 |
| 21 | 232 | 1.11 | 1.12 | 1.09 | 1.07 |
| 22 | 226 | 1.22 | 1.23 | 1.22 | 1.20 |
| 23 | 232 | 1.15 | 1.12 | 1.08 | 1.05 |
| 24 | 373 | 0.91 | 0.99 | 0.78 | 0.86 |

TABLE 28

| | Comparative Example | | | | | Invention Example | | | |
|---|---|---|---|---|---|---|---|---|---|
| | 34 | 35 | 36 | 37 | 38 | 25 | 26 | 27 | 28 |
| PEDOT/PSS disp D0 neutralized with IM aq. imidazole to pH = 3.5 | — | 45.80 | 45.80 | 45.80 | 45.80 | 45.80 | 45.80 | 45.80 | 45.80 |
| PEDOT/PSS disp D0 | 45.80 | | | | | | | | |
| 5 wt % aq. Zonyl ® FSO100 | 1.0 | 1.0 | 1.0 | 1.0 | 1.0 | 1.0 | 1.0 | 1.0 | 1.0 |
| compound 5 | 0.37 | — | — | — | — | 0.35 | 0.35 | 0.35 | 0.35 |
| diethylene glycol | 5.70 | 5.70 | — | — | — | 5.70 | — | — | — |
| formamide | — | — | 5.70 | — | — | — | 5.70 | — | — |
| 2-pyrrolidone | — | — | — | 5.70 | — | — | — | 5.70 | — |
| DMSO | — | — | — | — | 5.70 | — | — | — | 5.70 |
| deionized water | 47.50 | 47.50 | 47.50 | 47.50 | 47.50 | 47.13 | 47.13 | 47.13 | 47.13 |
| | 100.0 | 100.0 | 100.0 | 100.0 | 100.0 | 100.0 | 100.0 | 100.0 | 100.0 |
| wt % PEDOT/PSS | 0.527 | 0.511 | 0.511 | 0.511 | 0.511 | 0.511 | 0.511 | 0.511 | 0.511 |
| wt % imidazole | — | 0.0907 | 0.0907 | 0.0907 | 0.0907 | 0.0907 | 0.0907 | 0.0907 | 0.0907 |
| wt % compound 5 | 0.37 | — | — | — | — | 0.35 | 0.35 | 0.35 | 0.35 |
| wt % DEG | 5.70 | 5.70 | — | — | — | 5.70 | — | — | — |
| wt % formamide | — | — | 5.70 | — | — | — | 5.70 | — | — |
| wt % 2-pyrrolidone | — | — | — | 5.70 | — | — | — | 5.70 | — |
| wt % DMSO | — | — | — | — | 5.70 | — | — | — | 5.70 |

The compositions of COMPARATIVE EXAMPLES 34 to 38 and INVENTION EXAMPLES 25 to 28 were coated on a 175 μm thick transparent PET sheet provided with subbing layer 1 on the side of the PET sheet being coated with a BRAIVE coater at coating speed 2 with a barcoater giving a wet-layer thickness of 40 μm and the coatings dried for 3 minutes at 130° C. Four strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each fresh untreated strip was performed on two occasions during the measurements and the average recorded for each of the strips together with the average value for all five strips for each composition is given in Table 29 below.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 29.

TABLE 29

| | polyhydroxy- &/or carboxy group or amide or lactam group containing aliphatic compound or aprotic compound with dielectric constant ≧15 | OD | Surface resistance (SER) [Ω/square] | | | | | | |
|---|---|---|---|---|---|---|---|---|---|
| | | | strip nr 1 | strip nr 2 | strip nr 3 | strip nr 4 | strip nr 5 | average | SER × OD |
| Comparative Example nr. | | | | | | | | | |
| 34 | — | 0.068 | 377 | 436 | 448 | 525 | 526 | 462 | 31.4 |
| 35 | diethylene glycol | 0.073 | 232 | 217 | 207 | 231 | 230 | 223 | 16.3 |
| 36 | formamide | 0.077 | 246 | 227 | 229 | 230 | 222 | 231 | 17.8 |
| 37 | 2-pyrrolidone | 0.070 | 292 | 283 | 279 | 281 | 277 | 282 | 19.7 |
| 38 | dimethyl sulphoxide | 0.073 | 297 | 258 | 269 | 267 | 262 | 271 | 19.8 |
| Invention Example nr. | | | | | | | | | |
| 25 | diethylene glycol | 0.068 | 248 | 250 | 251 | 253 | 255 | 251 | 17.1 |
| 26 | formamide | 0.075 | 270 | 260 | 260 | 259 | 261 | 262 | 19.6 |
| 27 | 2-pyrrolidone | 0.070 | 316 | 309 | 303 | 303 | 310 | 308 | 21.6 |
| 28 | dimethyl sulphoxide | 0.068 | 308 | 303 | 314 | 311 | 313 | 310 | 21.1 |

The surface resistance results in Table 29 showed an increase in surface resistance upon addition of methyl gallate to layers containing a polymer comprising (3,4-dialkoxythiophene) monomer units and a polyanion, imidazole and polyhydroxy- and/or carboxy group or amide or lactam group containing aliphatic compounds and aprotic compounds with a dielectric constant ≥15 such as diethylene glycol, formamide, 2-pyrrolidone or dimethyl sulphoxide. Moreover, the increase for diethylene glycol was significantly lower than when propyl gallate was incorporated.

The layers of COMPARATIVE EXAMPLES 34 to 38 and INVENTION EXAMPLES 25 to 28 were subjected to a Suntest-exposure for 48 and 96 hours in a SUNTEST CPS+ from Atlas with a low pressure Xenon lamp producing 765 W/m² and having a blackstandard T of 50 C and surface resistance measurements carried out on the layers fresh, after 48 and 96 hours exposure in the SUNTEST CPS+ and the results are summarized in Table 30 below:

TABLE 30

|  | Fresh surface resistance [Ω/square] | increase factor after 48 h Suntest | increase factor after 96 h Suntest |
|---|---|---|---|
| Comparative Example nr. | | | |
| 34 | 462 | 1.13 | 1.47 |
| 35 | 223 | 1.65 | 2.34 |
| 36 | 231 | 1.51 | 2.25 |
| 37 | 282 | 1.93 | 2.68 |
| 38 | 271 | 1.87 | 2.11 |
| Invention Example nr. | | | |
| 25 | 251 | 1.07 | 1.11 |
| 26 | 262 | 1.08 | 1.08 |
| 27 | 308 | 1.05 | 1.18 |
| 28 | 310 | 1.05 | 1.15 |

The SUNTEST-results in Table 30 show a strong increase in stability of the surface resistance values upon incorporation of methyl gallate in layers containing a polymer comprising (3,4-dialkoxythiophene) monomer units and a polyanion, imidazole and polyhydroxy- and/or carboxy group or amide or lactam group containing aliphatic compounds and aprotic compounds with a dielectric constant ≥15 such as diethylene glycol, formamide, 2-pyrrolidone or dimethyl sulphoxide.

The surface resistances of the layers of COMPARATIVE EXAMPLES 34 to 38 and INVENTION EXAMPLES 25 to 28 after 240 h and 500 h in 95% relative humidity at 60° C. are summarized in Table 31 below.

TABLE 31

|  | Fresh surface resistance [Ω/square] | increase factor after 240 h in 95% relative humidity at 60° C. | increase factor after 500 h in 95% relative humidity at 60° C. |
|---|---|---|---|
| Comparative Example nr. | | | |
| 34 | 462 | 0.76 | 0.75 |
| 35 | 223 | 1.51 | 1.34 |
| 36 | 231 | 1.24 | 1.17 |
| 37 | 282 | 1.10 | 1.15 |
| 38 | 271 | 1.21 | 1.19 |
| Invention Example nr. | | | |
| 25 | 251 | 1.07 | 1.01 |
| 26 | 262 | 0.98 | 0.98 |
| 27 | 308 | 0.89 | 0.91 |
| 28 | 310 | 0.89 | 0.87 |

The results of the tests at 95% relative humidity and 60° C. in Table 31 show a strong increase in thermal/moisture stability of the surface resistance values upon incorporation of methyl gallate in layers containing a polymer comprising (3,4-dialkoxythiophene) monomer units and a polyanion, imidazole and polyhydroxy- and/or carboxy group or amide or lactam group containing aliphatic compounds and aprotic compounds with a dielectric constant ≥15 such as diethylene glycol, formamide, 2-pyrrolidone or dimethyl sulphoxide.

INVENTION EXAMPLES 29 TO 37 AND COMPARATIVE EXAMPLES 39 TO 41

The ca. 0.51% by weight PEDOT/PSS compositions of COMPARATIVE 15 EXAMPLE INVENTION 34, COMPARATIVE EXAMPLES 39 to 41 and INVENTION EXAMPLES 29 to 37 were produced by adding the ingredients given in Tables 32 and 33 to the dispersions specified in Tables 32 and 33 respectively.

TABLE 32

|  | Comparative Example | | | |
|---|---|---|---|---|
|  | 34 | 39 | 40 | 41 |
| PEDOT/PSS disp D0 neutralized with IM aq. imidazole to pH = 3.5 | — | 45.80 | 45.80 | 45.80 |
| PEDOT/PSS disp D0 | 45.80 | — | — | — |
| 5 wt % aq. Zonyl ® FSO100 | 1.0 | 1.0 | 1.0 | 1.0 |
| compound 5 | 0.37 | — | — | — |
| DEG | 5.70 | 5.70 | — | 5.70 |
| formamide | — | — | 5.70 | 5.70 |
| deionized water | 47.50 | 47.50 | 47.50 | 41.80 |
|  | 100.0 | 100.0 | 100.0 | 100.0 |
| wt % PEDOT/PSS | 0.527 | 0.511 | 0.511 | 0.511 |
| wt % imidazole | — | 0.0907 | 0.0907 | 0.0907 |
| wt % compound 5 | 0.37 | — | — | — |
| wt % DEG | 5.70 | 5.70 | — | 5.70 |
| wt % formamide | — | — | 5.70 | 5.70 |
| final pH | — | 3.63 | 4.07 | 3.88 |

TABLE 33

|  | Invention Example | | | | | | | | |
|---|---|---|---|---|---|---|---|---|---|
|  | 29 | 30 | 31 | 32 | 33 | 34 | 35 | 36 | 37 |
| PEDOT/PSS disp D0 neutralized with IM imidazole to pH = 3.5 | 45.80 | 45.80 | 45.80 | 45.80 | 45.80 | 45.80 | 45.80 | 45.80 | 45.80 |

TABLE 33-continued

| | Invention Example | | | | | | | | |
|---|---|---|---|---|---|---|---|---|---|
| | 29 | 30 | 31 | 32 | 33 | 34 | 35 | 36 | 37 |
| 5 wt % aq. Zonyl ® FSO100 | 1.0 | 1.0 | 1.0 | 1.0 | 1.0 | 1.0 | 1.0 | 1.0 | 1.0 |
| wt % compound 5 | 0.37 | — | — | 0.37 | — | — | 0.37 | — | — |
| wt % compound 7 | — | 0.37 | — | — | 0.37 | — | — | 0.37 | — |
| wt % compound 12 | — | — | 0.37 | — | — | 0.37 | — | — | 0.37 |
| DEG | 5.70 | 5.70 | 5.70 | — | — | — | 5.70 | 5.70 | 5.70 |
| formamide | — | — | — | 5.70 | 5.70 | 5.70 | 5.70 | 5.70 | 5.70 |
| deionized water | 47.13 | 47.13 | 47.13 | 47.13 | 47.13 | 47.13 | 41.43 | 41.43 | 41.43 |
| | 100.0 | 100.0 | 100.0 | 100.0 | 100.0 | 100.0 | 100.0 | 100.0 | 100.0 |
| wt % PEDOT/PSS | 0.511 | 0.511 | 0.511 | 0.511 | 0.511 | 0.511 | 0.511 | 0.511 | 0.511 |
| wt % imidazole | 0.0907 | 0.0907 | 0.0907 | 0.0907 | 0.0907 | 0.0907 | 0.0907 | 0.0907 | 0.0907 |
| wt % compound 5 | 0.37 | — | — | 0.37 | — | — | 0.37 | — | — |
| wt % compound 7 | — | 0.37 | — | — | 0.37 | — | — | 0.37 | — |
| wt % compound 12 | — | — | 0.37 | — | — | 0.37 | — | — | 0.37 |
| wt % DEG | 5.70 | 5.70 | 5.70 | — | — | — | 5.70 | 5.70 | 5.70 |
| wt % formamide | — | — | — | 5.70 | 5.70 | 5.70 | 5.70 | 5.70 | 5.70 |
| final pH | 3.87 | 3.55 | 3.07 | 3.87 | 3.89 | 3.19 | 3.87 | 3.83 | 3.22 |

The compositions of COMPARATIVE EXAMPLES 34 and 39 to 41 and INVENTION EXAMPLES 29 to 37 were coated on a 175 µm thick transparent PET sheet provided with subbing layer 1 on the side of the PET sheet being coated with a BRAIVE coater at coating speed 2 with a barcoater giving a wet-layer thickness of 40 µm and the coatings dried for 3 minutes at 130° C. Four strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each fresh untreated strip was performed on two occasions during the measurements and the average recorded for each of the strips together with the average value for all five strips for each composition is given in Table 34 below.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 34.

TABLE 34

| | Compound nr | polyhydroxy-group containing aliphatic cpd &/or aprotic cpd with dielectric constant ≧15 | OD | Surface resistance (SER) [Ω/square] | | | | | average | SER × OD |
|---|---|---|---|---|---|---|---|---|---|---|
| | | | | strip nr 1 | strip nr 2 | strip nr 3 | strip nr 4 | strip nr 5 | | |
| Comparative Example nr. | | | | | | | | | | |
| 34 | 5 | — | 0.068 | 377 | 436 | 448 | 525 | 526 | 462 | 31.4 |
| 39 | — | DEG | 0.067 | 248 | 234 | 244 | 259 | 227 | 242 | 16.2 |
| 40 | — | formamide | 0.068 | 265 | 255 | 254 | 251 | 247 | 254 | 17.3 |
| 41 | — | DEG/formamide | 0.068 | 265 | 261 | 260 | 265 | 255 | 261 | 17.7 |
| Invention Example nr. | | | | | | | | | | |
| 29 | 5 | DEG | 0.065 | 287 | 276 | 277 | 272 | 269 | 276 | 17.9 |
| 30 | 7 | DEG | 0.062 | 287 | 289 | 291 | 296 | 287 | 290 | 18.0 |
| 31 | 12 | DEG | 0.063 | 279 | 282 | 283 | 284 | 281 | 282 | 17.8 |
| 33 | 5 | formamide | 0.070 | 300 | 314 | 319 | 269 | 284 | 297 | 20.8 |
| 34 | 7 | formamide | 0.067 | 303 | 298 | 295 | 294 | 289 | 296 | 19.8 |
| 34 | 12 | formamide | 0.067 | 301 | 293 | 291 | 291 | 281 | 291 | 19.5 |
| 35 | 5 | DEG/formamide | 0.067 | 305 | 303 | 305 | 303 | 298 | 303 | 20.3 |
| 36 | 7 | DEG/formamide | 0.065 | 306 | 312 | 302 | 307 | 304 | 306 | 19.9 |
| 37 | 12 | DEG/formamide | 0.065 | 301 | 299 | 300 | 296 | 292 | 298 | 19.4 |

The surface resistance results in Table 34 showed an increase in surface resistance upon addition of methyl gallate (compound 5), propyl gallate (compound 7) or 3,4-dihydroxybenzoic acid (compound 12) in layers containing a polymer comprising (3,4-dialkoxythiophene) monomer units and a polyanion, imidazole and diethylene glycol, a polyhydroxy-group containing aliphatic compound, formamide, an aprotic compound with a dielectric constant ≧15 or for a combination of equal quantities of diethylene glycol and formamide.

The layers of COMPARATIVE EXAMPLES 34 and 39 to 41 and INVENTION EXAMPLES 29 to 37 were subjected to a Suntest-exposure for 48 and 96 hours in a SUNTEST CPS+ from Atlas with a low pressure Xenon lamp producing 765 W/m$^2$ and having a blackstandard T of 50 C and surface resistance measurements carried out on the layers fresh, after 48 and 96 hours exposure in the SUNTEST CPS+ and the results are summarized in Table 35 below:

taining a polymer comprising (3,4-dialkoxythiophene) monomer units and a polyanion, imidazole and diethylene glycol, a polyhydroxy-group containing aliphatic compound, formamide, an aprotic compound with a dielectric constant ≧15 or for a combination of equal quantities of diethylene glycol and formamide.

The surface resistances of the layers of COMPARATIVE EXAMPLES 34 and 39 to 41 and INVENTION EXAMPLES 29 to 37 after 240 h and 500 h in 95% relative humidity at 60° C. are summarized in Table 36 below.

The results of the tests at 95% relative humidity and 60° C. in Table 32 show a strong increase in thermal/moisture stability of the surface resistance values upon incorporation of methyl gallate (compound 5), propyl gallate (compound 7) or 3,4-dihydroxybenzoic acid (compound 12) in layers containing a polymer comprising (3,4-dialkoxythiophene) monomer units and a polyanion, imidazole and diethylene glycol, a

TABLE 35

| | Compound nr | | Fresh surface resistance [Ω/square] | increase factor after 48 h Suntest | increase factor after 96 h Suntest |
|---|---|---|---|---|---|
| Comparative Example nr. | | | | | |
| 34 | 5 | — | 462 | 1.13 | 1.47 |
| 39 | — | DEG | 242 | 1.77 | 2.84 |
| 40 | — | formamide | 254 | 1.55 | 2.52 |
| 41 | — | DEG/formamide | 261 | 1.49 | 2.00 |
| Invention Example nr. | | | | | |
| 29 | 5 | DEG | 276 | 1.06 | 1.04 |
| 30 | 7 | DEG | 290 | 1.22 | 1.07 |
| 31 | 12 | DEG | 282 | 1.22 | 1.04 |
| 32 | 5 | formamide | 297 | 1.06 | 1.05 |
| 33 | 7 | formamide | 296 | 1.26 | 1.01 |
| 34 | 12 | formamide | 291 | 1.03 | 0.99 |
| 35 | 5 | DEG/formamide | 303 | 1.12 | 1.12 |
| 36 | 7 | DEG/formamide | 306 | 1.21 | 1.07 |
| 37 | 12 | DEG/formamide | 298 | 1.17 | 1.06 |

The SUNTEST-results in Table 35 show a strong increase in stability of the surface resistance values upon incorporation of methyl gallate (compound 5), propyl gallate (compound 7) or 3,4-dihydroxybenzoic acid (compound 12) in layers containing polyhydroxy-group containing aliphatic compound, formamide, an aprotic compound with a dielectric constant ≧15 or for a combination of equal quantities of diethylene glycol and formamide.

TABLE 36

| | Compound nr | | Fresh surface resistance [Ω/square] | increase factor after 240 h in 95% relative humidity at 60° C. | increase factor after 500 h in 95% relative humidity at 60° C. |
|---|---|---|---|---|---|
| Comparative Example nr. | | | | | |
| 34 | 5 | — | 462 | 0.76 | 0.75 |
| 39 | — | DEG | 242 | 1.13 | 1.34 |
| 40 | — | formamide | 254 | 1.08 | 1.24 |
| 41 | — | DEG/formamide | 261 | 1.13 | 1.21 |

TABLE 36-continued

| Invention Example nr. | Compound nr | | Fresh surface resistance [Ω/square] | increase factor after 240 h in 95% relative humidity at 60° C. | increase factor after 500 h in 95% relative humidity at 60° C. |
|---|---|---|---|---|---|
| 29 | 5 | DEG | 276 | 0.98 | 1.00 |
| 30 | 7 | DEG | 290 | 0.94 | 0.97 |
| 31 | 12 | DEG | 282 | 0.97 | 1.08 |
| 32 | 5 | formamide | 297 | 0.93 | 0.93 |
| 33 | 7 | formamide | 296 | 0.92 | 0.98 |
| 34 | 12 | formamide | 291 | 0.98 | 1.04 |
| 35 | 5 | DEG/formamide | 303 | 0.97 | 0.96 |
| 36 | 7 | DEG/formamide | 306 | 0.91 | 0.98 |
| 37 | 12 | DEG/formamide | 298 | 0.90 | 1.00 |

INVENTION EXAMPLES 38 TO 46 AND COMPARATIVE EXAMPLES 34 AND 42 TO 44

The ca. 0.51% by weight PEDOT/PSS compositions of COMPARATIVE EXAMPLE INVENTION 34, COMPARATIVE EXAMPLES 42 to 44 and INVENTION EXAMPLES 38 to 46 were produced by adding the ingredients given in Tables 37 and 38 to the dispersions specified in Tables 37 and 38 respectively.

TABLE 37

| | Comparative Example | | | |
|---|---|---|---|---|
| | 34 | 42 | 43 | 44 |
| PEDOT/PSS disp D0 neutralized with IM DMAE to pH = 3.5 | — | 45.80 | 45.80 | 45.80 |
| PEDOT/PSS disp D0 | 45.80 | — | — | — |
| 5 wt % aq. Zonyl ® FSO100 | 1.0 | 1.0 | 1.0 | 1.0 |
| compound 5 | 0.37 | — | — | — |
| DEG | 5.70 | 5.70 | — | 5.70 |
| formamide | — | — | 5.70 | 5.70 |
| deionized water | 47.50 | 47.50 | 47.50 | 41.80 |
| | 100.0 | 100.0 | 100.0 | 100.0 |
| wt % PEDOT/PSS | 0.527 | 0.511 | 0.511 | 0.511 |
| wt % DMAE | — | 0.118 | 0.118 | 0.118 |
| wt % compound 5 | 0.37 | — | — | — |
| wt % DEG | 5.70 | 5.70 | — | 5.70 |
| wt % formamide | — | — | 5.70 | 5.70 |
| final pH | — | 3.57 | 3.92 | 3.94 |

TABLE 38

| | Invention Example | | | | | | | | |
|---|---|---|---|---|---|---|---|---|---|
| | 38 | 39 | 40 | 41 | 42 | 43 | 44 | 45 | 46 |
| PEDOT/PSS disp D0 neutralized with IM DMAE to pH = 3.5 | 45.80 | 45.80 | 45.80 | 45.80 | 45.80 | 45.80 | 45.80 | 45.80 | 45.80 |
| 5 wt % aq. Zonyl ® FSO100 | 1.0 | 1.0 | 1.0 | 1.0 | 1.0 | 1.0 | 1.0 | 1.0 | 1.0 |
| wt % compound 5 | 0.37 | — | — | 0.37 | — | — | 0.37 | — | — |
| wt % compound 7 | — | 0.37 | — | — | 0.37 | — | — | 0.37 | — |
| wt % compound 12 | — | — | 0.37 | — | — | 0.37 | — | — | 0.37 |
| DEG | 5.70 | 5.70 | 5.70 | — | — | — | 5.70 | 5.70 | 5.70 |
| formamide | — | — | — | 5.70 | 5.70 | 5.70 | 5.70 | 5.70 | 5.70 |
| deionized water | 47.13 | 47.13 | 47.13 | 47.13 | 47.13 | 47.13 | 41.43 | 41.43 | 41.43 |
| | 100.0 | 100.0 | 100.0 | 100.0 | 100.0 | 100.0 | 100.0 | 100.0 | 100.0 |
| wt % PEDOT/PSS | 0.511 | 0.511 | 0.511 | 0.511 | 0.511 | 0.511 | 0.511 | 0.511 | 0.511 |
| wt % DMAE | 0.118 | 0.118 | 0.118 | 0.118 | 0.118 | 0.118 | 0.118 | 0.118 | 0.118 |
| wt % compound 5 | 0.37 | — | — | 0.37 | — | — | 0.37 | — | — |
| wt % compound 7 | — | 0.37 | — | — | 0.37 | — | — | 0.37 | — |
| wt % compound 12 | — | — | 0.37 | — | — | 0.37 | — | — | 0.37 |
| wt % DEG | 5.70 | 5.70 | 5.70 | — | — | — | 5.70 | 5.70 | 5.70 |
| wt % formamide | — | — | — | 5.70 | 5.70 | 5.70 | 5.70 | 5.70 | 5.70 |
| final pH | 3.49 | 3.52 | 3.08 | 3.79 | 3.84 | 3.26 | 3.82 | 3.84 | 3.30 |

The compositions of COMPARATIVE EXAMPLES 34 and 42 to 44 and INVENTION EXAMPLES 38 to 46 were coated on a 175 μm thick transparent PET sheet provided with subbing layer 1 on the side of the PET sheet being coated with a BRAIVE coater at coating speed 2 with a barcoater giving a wet-layer thickness of 40 μm and the coatings dried for 3 minutes at 130° C. Four strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each fresh untreated strip was performed on two occasions during the measurements and the average recorded for each of the strips together with the average value for all five strips for each composition is given in Table 39 below.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 39.

The surface resistance results in Table 39 showed an increase in surface resistance upon addition of methyl gallate (compound 5), propyl gallate (compound 7) or 3,4-dihydroxybenzoic acid (compound 12) in layers containing a polymer comprising (3,4-dialkoxythiophene) monomer units and a polyanion, dimethylaminoethanol and diethylene glycol, a polyhydroxy-group containing aliphatic compound, formamide, an aprotic compound with a dielectric constant $\geq 15$ or for a combination of equal quantities of diethylene glycol and formamide. However, the surface resistance values realized in the layers of INVENTION EXAMPLES 38 to 46 were significantly lower than those realized in the respective layers of INVENTION EXAMPLES 29 to 37 which only differed in containing imidazole instead of dimethylaminoethanol.

The layers of COMPARATIVE EXAMPLES 34 and 39 to 41 and INVENTION EXAMPLES 38 to 46 were subjected to a Suntest-exposure for 48 and 96 hours in a SUNTEST CPS+ from Atlas with a low pressure Xenon lamp producing 765 W/m$^2$ and having a blackstandard T of 50 C and surface resistance measurements carried out on the layers fresh, after 48 and 96 hours exposure in the SUNTEST CPS+ and the results are summarized in Table 40 below:

TABLE 39

| | Compound nr | polyhydroxy-group containing aliphatic cpd &/or aprotic cpd with dielectric constant $\geq 15$ | OD | Surface resistance (SER) [Ω/square] | | | | | | SER × OD |
|---|---|---|---|---|---|---|---|---|---|---|
| | | | | strip nr 1 | strip nr 2 | strip nr 3 | strip nr 4 | strip nr 5 | average | |
| Comparative Example nr. | | | | | | | | | | |
| 34 | 5 | — | 0.068 | 377 | 436 | 448 | 525 | 526 | 462 | 31.4 |
| 42 | — | DEG | 0.090 | 223 | 220 | 230 | 221 | 216 | 222 | 20.0 |
| 43 | — | formamide | 0.077 | 230 | 231 | 240 | 248 | 223 | 234 | 18.0 |
| 44 | — | DEG/formamide | 0.075 | 236 | 235 | 246 | 238 | 221 | 235 | 17.6 |
| Invention Example nr. | | | | | | | | | | |
| 38 | 5 | DEG | 0.067 | 243 | 251 | 268 | 249 | 237 | 250 | 16.7 |
| 39 | 7 | DEG | 0.068 | 258 | 244 | 247 | 246 | 241 | 247 | 16.8 |
| 40 | 12 | DEG | 0.070 | 249 | 247 | 248 | 246 | 245 | 247 | 17.3 |
| 41 | 5 | formamide | 0.075 | 257 | 261 | 260 | 255 | 259 | 258 | 19.3 |
| 42 | 7 | formamide | 0.075 | 268 | 253 | 259 | 266 | 268 | 263 | 19.7 |
| 43 | 12 | formamide | 0.073 | 265 | 252 | 255 | 256 | 258 | 257 | 18.8 |
| 44 | 5 | DEG/formamide | 0.072 | 273 | 353 | 300 | 283 | 273 | 296 | 21.3 |
| 45 | 7 | DEG/formamide | 0.070 | 291 | 283 | 289 | 282 | 279 | 285 | 19.9 |
| 46 | 12 | DEG/formamide | 0.072 | 273 | 267 | 264 | 268 | 270 | 268 | 19.3 |

TABLE 40

| Compound nr | | Fresh surface resistance [Ω/square] | increase factor after 48 h Suntest | increase factor after 96 h Suntest |
|---|---|---|---|---|
| Comparative Example nr. | | | | |
| 34 | 5 | — | 462 | 1.13 | 1.47 |
| 42 | — | DEG | 222 | 1.78 | 2.31 |
| 43 | — | formamide | 234 | 1.82 | 2.18 |
| 44 | — | DEG/formamide | 235 | 1.95 | 2.17 |
| Invention Example nr. | | | | |
| 38 | 5 | DEG | 250 | 1.01 | 1.10 |
| 39 | 7 | DEG | 247 | 1.11 | 1.77 |
| 40 | 12 | DEG | 247 | 1.03 | 1.14 |
| 41 | 5 | formamide | 258 | 0.93 | 1.02 |
| 42 | 7 | formamide | 263 | 1.00 | 1.69 |
| 43 | 12 | formamide | 257 | 0.97 | 1.04 |
| 44 | 5 | DEG/formamide | 296 | 0.90 | 1.17 |
| 45 | 7 | DEG/formamide | 285 | 0.99 | 1.65 |
| 46 | 12 | DEG/formamide | 268 | 0.97 | 1.18 |

The SUNTEST-results in Table 40 show a strong increase in stability of the surface resistance values upon incorporation of methyl gallate (compound 5), propyl gallate (compound 7) or 3,4-dihydroxybenzoic acid (compound 12) in layers containing a polymer comprising (3,4-dialkoxythiophene) monomer units and a polyanion, dimethylaminoethanol and diethylene glycol, a polyhydroxy-group containing aliphatic compound, formamide, an aprotic compound with a dielectric constant ≧15 or for a combination of equal quantities of diethylene glycol and formamide.

The surface resistances of the layers of COMPARATIVE EXAMPLES 34 and 39 to 41 and INVENTION EXAMPLES 38 to 46 after 240 h and 500 h in 95% relative humidity at 60° C. are summarized in Table 41 below.

TABLE 41

| Compound nr | | Fresh surface resistance [Ω/square] | increase factor after 240 h in 95% relative humidity at 60° C. | increase factor after 500 h in 95% relative humidity at 60° C. |
|---|---|---|---|---|
| Comparative Example nr. | | | | |
| 34 | 5 | — | 462 | 0.76 | 0.75 |
| 42 | — | DEG | 222 | 1.13 | 1.15 |
| 43 | — | formamide | 234 | 1.11 | 1.15 |
| 44 | — | DEG/formamide | 235 | 1.12 | 1.13 |
| Invention Example nr. | | | | |
| 38 | 5 | DEG | 250 | 0.96 | 0.95 |
| 39 | 7 | DEG | 247 | 1.02 | 1.02 |
| 40 | 12 | DEG | 247 | 1.00 | 1.02 |
| 41 | 5 | formamide | 258 | 0.93 | 0.97 |
| 42 | 7 | formamide | 263 | 0.96 | 0.96 |
| 43 | 12 | formamide | 257 | 0.97 | 1.03 |
| 44 | 5 | DEG/formamide | 296 | 0.74 | 0.86 |
| 45 | 7 | DEG/formamide | 285 | 0.98 | 0.95 |
| 46 | 12 | DEG/formamide | 268 | 1.07 | 1.02 |

The results of the tests at 95% relative humidity and 60° C. in Table 32 show a strong increase in thermal/moisture stability of the surface resistance values upon incorporation of methyl gallate (compound 5), propyl gallate (compound 7) or 3,4-dihydroxybenzoic acid (compound 12) in layers containing a polymer comprising (3,4-dialkoxythiophene) monomer units and a polyanion, dimethylaminoethanol and diethylene glycol, a polyhydroxy-group containing aliphatic compound, formamide, an aprotic compound with a dielectric constant ≧15 or for a combination of equal quantities of diethylene glycol and formamide.

INVENTION EXAMPLES 47 TO 55 AND COMPARATIVE EXAMPLES 34 AND 45 TO 47

The ca. 0.51% by weight PEDOT/PSS compositions of COMPARATIVE EXAMPLE INVENTION 34, COMPARATIVE EXAMPLES 45 to 47 and INVENTION EXAMPLES 47 to 55 were produced by adding the ingredients given in Tables 42 and 43 to the dispersions specified in Tables 42 and 43 respectively.

TABLE 42

|  | Comparative Example | | | |
|---|---|---|---|---|
|  | 34 | 45 | 46 | 47 |
| PEDOT/PSS disp D0 neutralized with 10 wt % aq pyridine to pH = 3.5 | — | 45.80 | 45.80 | 45.80 |
| PEDOT/PSS disp D0 | 45.80 | — | — | — |
| 5 wt % aq. Zonyl® FSO100 | 1.0 | 1.0 | 1.0 | 1.0 |
| compound 5 | 0.37 | — | — | — |
| DEG | 5.70 | 5.70 | — | 5.70 |
| formamide | — | — | 5.70 | 5.70 |
| deionized water | 47.50 | 47.50 | 47.50 | 41.80 |
|  | 100.0 | 100.0 | 100.0 | 100.0 |
| wt % PEDOT/PSS | 0.527 | 0.511 | 0.511 | 0.511 |
| wt % pyridine | — | 0.138 | 0.138 | 0.138 |
| wt % compound 5 | 0.37 | — | — | — |
| wt % DEG | 5.70 | 5.70 | — | 5.70 |
| wt % formamide | — | — | 5.70 | 5.70 |
| final pH | — | 3.52 | 3.73 | 3.73 |

TABLE 43

|  | Invention Example | | | | | | | | |
|---|---|---|---|---|---|---|---|---|---|
|  | 47 | 48 | 49 | 50 | 51 | 52 | 53 | 54 | 55 |
| PEDOT/PSS disp D0 neutralized with 10 wt % aq. pyridine to pH = 3.5 | 45.80 | 45.80 | 45.80 | 45.80 | 45.80 | 45.80 | 45.80 | 45.80 | 45.80 |
| 5 wt % aq. Zonyl® FSO100 | 1.0 | 1.0 | 1.0 | 1.0 | 1.0 | 1.0 | 1.0 | 1.0 | 1.0 |
| wt % compound 5 | 0.37 | — | — | 0.37 | — | — | 0.37 | — | — |
| wt % compound 7 | — | 0.37 | — | — | 0.37 | — | — | 0.37 | — |
| wt % compound 12 | — | — | 0.37 | — | — | 0.37 | — | — | 0.37 |
| DEG | 5.70 | 5.70 | 5.70 | — | — | — | 5.70 | 5.70 | 5.70 |
| formamide | — | — | — | 5.70 | 5.70 | 5.70 | 5.70 | 5.70 | 5.70 |
| deionized water | 47.13 | 47.13 | 47.13 | 47.13 | 47.13 | 47.13 | 41.43 | 41.43 | 41.43 |
|  | 100.0 | 100.0 | 100.0 | 100.0 | 100.0 | 100.0 | 100.0 | 100.0 | 100.0 |
| wt % PEDOT/PSS | 0.511 | 0.511 | 0.511 | 0.511 | 0.511 | 0.511 | 0.511 | 0.511 | 0.511 |
| wt % pyridine | 0.138 | 0.138 | 0.138 | 0.138 | 0.138 | 0.138 | 0.138 | 0.138 | 0.138 |
| wt % compound 5 | 0.37 | — | — | 0.37 | — | — | 0.37 | — | — |
| wt % compound 7 | — | 0.37 | — | — | 0.37 | — | — | 0.37 | — |
| wt % compound 12 | — | — | 0.37 | — | — | 0.37 | — | — | 0.37 |
| wt % DEG | 5.70 | 5.70 | 5.70 | — | — | — | 5.70 | 5.70 | 5.70 |
| wt % formamide | — | — | — | 5.70 | 5.70 | 5.70 | 5.70 | 5.70 | 5.70 |
| final pH | 3.44 | 3.51 | 3.08 | 3.69 | 3.73 | 3.23 | 3.71 | 3.72 | 3.28 |

The compositions of COMPARATIVE EXAMPLES 34 and 39 to 41 and INVENTION EXAMPLES 29 to 37 were coated on a 175 μm thick transparent PET sheet provided with subbing layer 1 on the side of the PET sheet being coated with a BRAIVE coater at coating speed 2 with a barcoater giving a wet-layer thickness of 40 μm and the coatings dried for 3 minutes at 130° C. Four strips 45 mm wide were cut from the middle of the coated sheet for surface resistance experiments.

The surface resistances at room temperature were determined by contacting the outermost layer with parallel electrodes each 45 mm long and 45 mm apart capable of forming line contacts with copper electrodes via silver-filled rubber, the electrodes being separated by a Teflon insulator. This enables a direct measurement of the surface resistance to be realized. The surface resistance of each fresh untreated strip was performed on two occasions during the measurements and the average recorded for each of the strips together with the average value for all five strips for each composition is given in Table 44 below.

The optical density measurements were carried out in transmission with a MacBeth TR924 densitometer with a visible filter with six strips with coatings and six strips without coatings to take the contribution from the support into consideration and the difference divided by six to provide the optical density for a single strip recorded in Table 44.

The surface resistance results in Table 44 showed a slight increase in surface resistance upon addition of methyl gallate (compound 5), propyl gallate (compound 7) or 3,4-dihydroxybenzoic acid (compound 12) to layers containing a polymer comprising (3,4-dialkoxythiophene) monomer units and a polyanion, pyridine and diethylene glycol, a polyhydroxy-group containing aliphatic compound, although the difference in surface resistance values was significantly smaller than in the case of the layers of respective INVENTION EXAMPLES 29 to 37 or respective INVENTION EXAMPLES 38 to 46 which only differed in containing imidazole or dimethylaminoethanol instead of pyridine.

TABLE 44

| Comparative Example nr. | Compound nr | polyhydroxy-group containing aliphatic cpd &/or aprotic cpd with dielectric constant ≧15 | OD | Surface resistance (SER) [Ω/square] | | | | | | |
|---|---|---|---|---|---|---|---|---|---|---|
| | | | | strip nr 1 | strip nr 2 | strip nr 3 | strip nr 4 | strip nr 5 | average | SER × OD |
| 34 | 5 | — | 0.068 | 377 | 436 | 448 | 525 | 526 | 462 | 31.4 |
| 45 | — | DEG | 0.070 | 209 | 180 | 186 | 183 | 203 | 192 | 13.4 |
| 46 | — | formamide | 0.073 | 207 | 186 | 196 | 199 | 192 | 196 | 14.3 |
| 47 | — | DEG/formamide | 0.072 | 227 | 209 | 213 | 211 | 211 | 214 | 15.4 |
| Invention Example nr. | | | | | | | | | | |
| 47 | 5 | DEG | 0.067 | 232 | 205 | 210 | 215 | 207 | 214 | 14.3 |
| 48 | 7 | DEG | 0.067 | 232 | 212 | 220 | 213 | 213 | 218 | 14.6 |
| 49 | 12 | DEG | 0.067 | 215 | 216 | 213 | 215 | 211 | 214 | 14.3 |
| 50 | 5 | formamide | 0.068 | 223 | 212 | 207 | 217 | 208 | 213 | 14.5 |
| 51 | 7 | formamide | 0.067 | 217 | 208 | 213 | 209 | 207 | 211 | 14.1 |
| 52 | 12 | formamide | 0.068 | 209 | 205 | 213 | 210 | 203 | 208 | 14.1 |
| 53 | 5 | DEG/formamide | 0.067 | 238 | 225 | 224 | 231 | 225 | 229 | 15.3 |
| 54 | 7 | DEG/formamide | 0.067 | 228 | 230 | 225 | 230 | 224 | 227 | 15.2 |
| 55 | 12 | DEG/formamide | 0.068 | 229 | 225 | 237 | 229 | 236 | 231 | 15.7 |

The product of the surface resistance and optical density gives a more reliable guide to the electrical conductivity of the layer, since the surface resistance is dependent upon the layer thickness which the optical density is dependent upon. In the case of layers containing a polymer comprising (3,4-dialkoxythiophene) monomer units and a polyanion, pyridine and formamide, an aprotic compound with a dielectric constant ≧15, or diethylene glycol and pyridine no significant increase in the product of the surface resistance and optical density was observed upon incorporation of methyl gallate (compound 5), propyl gallate (compound 7) or 3,4-dihydroxybenzoic acid (compound 12) unlike the case of the layers of INVENTION EXAMPLES 29 to 37 or INVENTION EXAMPLES 38 to 46 which only differed in containing imidazole and dimethylaminoethanol instead of pyridine.

Furthermore, the surface resistance values realized in the layers of INVENTION EXAMPLES 47 to 55 were significantly lower than those realized in the layers of respective INVENTION EXAMPLES 29 to 37 or respective INVENTION EXAMPLES 38 to 46 which only differed in containing imidazole or dimethylaminoethanol instead of pyridine.

The layers of COMPARATIVE EXAMPLES 34 and 45 to 47 and INVENTION EXAMPLES 47 to 55 were subjected to a Suntest-exposure for 48 and 96 hours in a SUNTEST CPS+ from Atlas with a low pressure Xenon lamp producing 765 W/m² and having a blackstandard T of 50 C and surface resistance measurements carried out on the layers fresh, after 48 and 96 hours exposure in the SUNTEST CPS+ and the results are summarized in Table 45 below:

TABLE 45

| | Compound nr | | Fresh surface resistance [Ω/square] | increase factor after 48 h Suntest | increase factor after 96 h Suntest |
|---|---|---|---|---|---|
| Comparative Example nr. | | | | | |
| 34 | 5 | — | 462 | 1.13 | 1.47 |
| 45 | — | DEG | 192 | 1.87 | 3.44 |
| 46 | — | formamide | 196 | 1.65 | 2.52 |
| 47 | — | DEG/formamide | 214 | 1.73 | 2.38 |
| Invention Example nr. | | | | | |
| 47 | 5 | DEG | 214 | 1.04 | 1.15 |
| 48 | 7 | DEG | 218 | 1.05 | 1.12 |
| 49 | 12 | DEG | 214 | 1.03 | 1.15 |
| 50 | 5 | formamide | 213 | 1.07 | 1.08 |
| 51 | 7 | formamide | 211 | 1.04 | 1.18 |
| 52 | 12 | formamide | 208 | 1.04 | 1.11 |
| 53 | 5 | DEG/formamide | 229 | 1.07 | 1.11 |
| 54 | 7 | DEG/formamide | 227 | 1.06 | 1.14 |
| 55 | 12 | DEG/formamide | 231 | 1.10 | 1.09 |

The SUNTEST-results in Table 45 show a strong increase in stability of the surface resistance values upon incorporation of methyl gallate (compound 5), propyl gallate (compound 7) or 3,4-dihydroxybenzoic acid (compound 12) in layers containing a polymer comprising (3,4-dialkoxythiophene) monomer units and a polyanion, pyridine and diethylene glycol, a polyhydroxy-group containing aliphatic compound, formamide, an aprotic compound with a dielectric constant $\geqq 15$ or for a combination of equal quantities of diethylene glycol and formamide.

The surface resistances of the layers of COMPARATIVE EXAMPLES 34 and 45 to 47 and INVENTION EXAMPLES 47 to 55 after 240 h and 500 h in 95% relative humidity at 60° C. are summarized in Table 46 below.

TABLE 46

| | Compound nr | | Fresh surface resistance [Ω/square] | increase factor after 240 h in 95% relative humidity at 60° C. | increase factor after 500 h in 95% relative humidity at 60° C. |
|---|---|---|---|---|---|
| Comparative Example nr. | | | | | |
| 34 | 5 | — | 462 | 0.76 | 0.75 |
| 45 | — | DEG | 192 | 1.43 | 1.61 |
| 46 | — | formamide | 196 | 1.29 | 1.45 |
| 47 | — | DEG/formamide | 214 | 1.24 | 1.60 |
| Invention Example nr. | | | | | |
| 47 | 5 | DEG | 214 | 1.12 | 1.21 |
| 48 | 7 | DEG | 218 | 1.16 | 1.19 |
| 49 | 12 | DEG | 214 | 1.05 | 1.15 |
| 50 | 5 | formamide | 213 | 1.13 | 1.21 |
| 51 | 7 | formamide | 211 | 1.20 | 1.23 |
| 52 | 12 | formamide | 208 | 1.12 | 1.16 |
| 53 | 5 | DEG/formamide | 229 | 1.07 | 1.15 |
| 54 | 7 | DEG/formamide | 227 | 1.11 | 1.19 |
| 55 | 12 | DEG/formamide | 231 | 1.06 | 1.09 |

The results of the tests at 95% relative humidity and 60° C. in Table 46 show a strong increase in thermal/moisture stability of the surface resistance values upon incorporation of methyl gallate (compound 5), propyl gallate (compound 7) or 3,4-dihydroxybenzoic acid (compound 12) in layers containing a polymer comprising (3,4-dialkoxythiophene) monomer units and a polyanion, pyridine and diethylene glycol, a polyhydroxy-group containing aliphatic compound, formamide, an aprotic compound with a dielectric constant $\geqq 15$ or for a combination of equal quantities of diethylene glycol and formamide.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A composition exclusive of hydroquinone comprising at least one polymer comprising (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of diethylene glycol, 1,2-propanediol, glycerol, hexylene glycol, propylene glycol, N,N,N',N'-tetramethylurea, tetramethylene sulphone, and dimethyl sulphoxide.

2. The composition according to claim 1, wherein said at least one polymer is selected from the group consisting of: poly(3,4-methylenedioxy-thiophene), poly(3,4-methylenedioxythiophene) derivatives, poly(3,4-ethylenedioxythiophene), poly(3,4-ethylenedioxy-thiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives and copolymers therewith.

3. The composition according to claim 1, wherein said polyanion is poly(styrene sulphonate).

4. The composition according to claim 1, wherein said at least one polyhydroxy group-containing aromatic compound exclusive of sulfo groups is selected from the group consisting of pyrogallol, gallic acid esters and polyhydroxy-benzoic acids.

5. The composition according to claim 1, wherein the at least one compound is diethylene glycol.

6. A layer configuration on a support, said layer configuration comprising a layer exclusive of hydroquinone comprising at least one polymer comprising optionally substituted (3,4-dialkoxythiophene) monomer units, in which the two alkoxy groups may be the same or different or together represent an optionally substituted oxy-alkylene-oxy bridge, a polyanion, at least one polyhydroxy group-containing aromatic compound exclusive of sulfo groups, at least one amino-compound or heterocyclic compound with at least one ring nitrogen atom, and at least one compound selected from the group consisting of diethylene glycol, 1,2-propanediol, glycerol, hexylene glycol, propylene glycol, N,N,N',N'-tetramethylurea, tetramethylene sulphone, and dimethyl sulphoxide.

7. The layer configuration according to claim 6, wherein said at least one polymer is selected from the group consisting of: poly(3,4-methylenedioxy-thiophene), poly(3,4-methylenedioxythiophene) derivatives, poly(3,4-ethylenedioxythiophene), poly(3,4-ethylenedioxy-thiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives and copolymers therewith.

8. The layer configuration according to claim 6, wherein said polyanion is poly(styrene sulphonate).

9. The layer configuration according to claim 6, wherein said layer configuration is a light emitting diode.

10. The layer configuration according to claim 6, wherein said layer configuration is a photovoltaic device.

11. The layer configuration according to claim 6, wherein said layer configuration is a solar cell.

12. The layer configuration according to claim 6, wherein said layer configuration is a transistor.

13. The layer configuration according to claim 5, wherein said layer configuration is an electroluminescent device.

14. The layer configuration according to claim 6, wherein said layer configuration is a touch screen.

15. The layer configuration according to claim 6, wherein said layer configuration is an e-paper configuration.

16. The layer configuration according to claim 6, wherein the at least one compound is diethylene glycol.

* * * * *

UNITED STATES PATENT AND TRADEMARK OFFICE
CERTIFICATE OF CORRECTION

| | | |
|---|---|---|
| PATENT NO. | : 7,820,078 B2 | Page 1 of 1 |
| APPLICATION NO. | : 12/107898 | |
| DATED | : October 26, 2010 | |
| INVENTOR(S) | : Frank Louwet | |

It is certified that error appears in the above-identified patent and that said Letters Patent is hereby corrected as shown below:

On the title page, item [73] the name of the assignee should be changed from "Agfa Graphics, N.V." to --Agfa-Gevaert, N.V.--.

Signed and Sealed this
Twenty-fourth Day of May, 2011

David J. Kappos
*Director of the United States Patent and Trademark Office*